United States Patent
Wang et al.

(10) Patent No.: US 11,817,103 B2
(45) Date of Patent: Nov. 14, 2023

(54) PATTERN RECOGNITION APPARATUS, PATTERN RECOGNITION METHOD, AND STORAGE MEDIUM

(71) Applicant: NEC Corporation, Tokyo (JP)

(72) Inventors: Qiongqiong Wang, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 453 days.

(21) Appl. No.: 16/647,099

(22) PCT Filed: Sep. 15, 2017

(86) PCT No.: PCT/JP2017/033583
§ 371 (c)(1),
(2) Date: Mar. 13, 2020

(87) PCT Pub. No.: WO2019/053898
PCT Pub. Date: Mar. 21, 2019

(65) Prior Publication Data
US 2020/0211567 A1 Jul. 2, 2020

(51) Int. Cl.
*G10L 17/04* (2013.01)
*G10L 17/18* (2013.01)
(Continued)

(52) U.S. Cl.
CPC ........ *G10L 17/04* (2013.01); *G06F 18/24137* (2023.01); *G06N 3/045* (2023.01);
(Continued)

(58) Field of Classification Search
CPC ........ G10L 17/04; G10L 17/18; G06K 9/6272
See application file for complete search history.

(56) References Cited

U.S. PATENT DOCUMENTS 9,401,148 B2 * 7/2016 Lei .................. G10L 17/18
2005/0033573 A1 2/2005 Hong et al.
(Continued)

FOREIGN PATENT DOCUMENTS

| JP | 2004-538526 A | 12/2004 |
| JP | 2015-176355 A | 10/2015 |

(Continued)

OTHER PUBLICATIONS

International Search Report for PCT Application No. PCT/JP2017/033583, dated Nov. 14, 2017.
(Continued)

*Primary Examiner* — Bryan S Blankenagel

(57) ABSTRACT

Provided is a pattern recognition apparatus to provide classification robustness to any kind of domain variability. The pattern recognition apparatus 500 based on Neural Network (NN) includes: NN training unit 501 that trains an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets; and NN verification unit 502 that verifies a pair of second feature vectors in the specific domain to output whether the pair indicates same individual or not, based on a target domain vector and the NN parameters.

15 Claims, 20 Drawing Sheets

(51) Int. Cl.
*G06N 3/084* (2023.01)
*G06F 18/2413* (2023.01)
*G06N 3/045* (2023.01)
*G06N 3/048* (2023.01)
*G06N 7/01* (2023.01)

(52) U.S. Cl.
CPC ............. *G06N 3/048* (2023.01); *G06N 3/084* (2013.01); *G06N 7/01* (2023.01); *G10L 17/18* (2013.01)

(56) References Cited

U.S. PATENT DOCUMENTS

| | | | |
|---|---|---|---|
| 2015/0269931 A1* | 9/2015 | Senior | G10L 15/063 704/245 |
| 2015/0294670 A1* | 10/2015 | Roblek | G10L 17/18 704/232 |
| 2016/0098993 A1 | 4/2016 | Yamamoto et al. | |
| 2016/0247061 A1* | 8/2016 | Trask | G06N 3/04 |
| 2016/0293167 A1* | 10/2016 | Chen | G10L 17/18 |
| 2017/0256254 A1* | 9/2017 | Huang | G06N 3/0445 |
| 2018/0137109 A1* | 5/2018 | Mangoubi | G06F 40/263 |
| 2018/0158463 A1* | 6/2018 | Ge | G10L 17/04 |
| 2020/0035231 A1* | 1/2020 | Parthasarathi | G10L 25/87 |

FOREIGN PATENT DOCUMENTS

| | | |
|---|---|---|
| JP | 2016-075740 A | 5/2016 |
| JP | 2020-533723 A | 11/2020 |
| WO | 03/015078 A1 | 2/2003 |
| WO | 2018/013401 A1 | 1/2018 |

OTHER PUBLICATIONS

English translation of Written opinion for PCT Application No. PCT/JP2017/033583.

D. Snyder, P. Ghahremani, D. Povey, D. Garcia-Romero, Y. Carmiel, S. Khudanpur, "Deep neural network-based speaker embeddings for end-to-end speaker verification", Spoken Language Technology Workshop (SLT), 2016 IEEE, USA.

F. Richardson, B. Nemsick, D. Reynolds, "Channel compensation for speaker recognition using map adapted PLDA and denoising DNNs", Odyssey 2016, Jun. 21-24, 2016, pp. 225-230, Bilbao, Spain.

W. Campbell et al., "Support vector machines using GMM supervectors for speaker verification" IEEE Signal Processing Letters, vol. 13, Issue: 5, pp. 308-311, 2006, USA.

N. Dehak, R. Dehak, P. Kenny, N. Brummer, P. Ouellet, and P. Dumouchel, "Support vector machines versus fast scoring in the low-dimensional total variability space for speaker verification", Interspeech 2009, pp. 1559-1562, Brighton UK.

Japanese Office Action for JP Application No. 2021-104706 dated Apr. 19, 2022 with English Translation.

* cited by examiner

PATTERN RECOGNITION APPARATUS, PATTERN RECOGNITION METHOD, AND STORAGE MEDIUM

This application is a National Stage Entry of PCT/JP2017/033583 filed on Sep. 15, 2017, the contents of all of which are incorporated herein by reference, in their entirety.

TECHNICAL FIELD

The present invention relates to a pattern recognition apparatus, a pattern recognition method, and program for classifying patterns such as images, videos, speech and audio to one of certain classes.

BACKGROUND ART

Pattern recognition techniques have their basis on machine learning theories and techniques. The techniques are widely applied to our daily life to solve real problems in such diverse areas as science, engineering, agriculture, e-commerce, medicine, medical imaging analysis, military, and national security.

Deep learning is a branch of machine learning based on a set of algorithms that attempt to model high level abstractions in data by using a large-scale graph with a number of processing layers, composed of multiple linear and non-linear transformations. Such multi-layer structure is called Deep Neural Network (DNN) or more generally Neural Network (NN). Neural Networks (NNs) are now well established as means to learn useful representations or abstractions of real world data. It has been proved to outperform many existing methods and algorithms due to its capability in learning complex non-linear relations among samples without any prior assumption which often causes inaccuracy in other methods. NN has been applied to pattern recognition fields such as computer vision, automatic speech recognition, natural language processing, audio recognition, image recognition, and bioinformatics, where they have been shown to produce state-of-the-art results on various tasks.

Not only in various fields can NN be applied, but also in various phases in each field. They can be used in pattern recognition systems such as feature extraction (e.g. bottleneck features), noise reduction (e.g. Denoising Auto Encoder; DAE), identification (e.g. Multi-Layer Perception; MLP), verification (e.g. Siamese network). The performance of these systems becomes very well only when a large amount of data is available for the NN trainings.

However, a NN-based pattern recognition is vulnerable to domain variability. "Domain" in this description refers to various conditions of data in a specific conceptual (semantic) category or area. For example, in the case of a domain in "speaker recognition", the domain varies depending on language difference, transmission channel difference, signal noise ratio (SNR) difference, and so on. Similarly, in the case that a domain is "face recognition", the domain varies depending on illumination difference, pose difference, SNR difference. Training a good NN in a domain needs a large amount of data in the domain (target domain). "Target domain" in this description refers to a specific domain whose data is applied to pattern recognition. The data in the target domain is called in-domain (IND) data. The data outside of the target domain is called out-of-domain (OOD) data. For example, training a good NN for recognition of Cantonese telephone data needs a large amount of Cantonese telephone data as IND data. Since Mandarin telephone data is not appropriate for this training, the data will be a kind of OOD data. A pattern recognition system including well trained NN using the Cantonese data results in good performance. On the other hand, a system including trained NN using the Mandarin data results in bad performance.

However, it is usually expensive or unrealistic to collect a large amount of IND data, and even harder for those with labels. "Label" in this specification refers to identifier (ID) for identifying individuals and classes (domains or speakers) to which individuals belong, such as class IDs, personal IDs in the case of speaker recognition or face recognition. Pattern recognition systems trained with OOD data rarely perform correctly. Thus, due to the fact that any such domain mismatch between training and evaluation data can greatly deteriorate the performance of NN pattern recognition of the systems, capability of such NN is hardly optimized.

NPL1 discloses a technology that uses Siamese network to discriminate between speech pairs (same-speaker and different-speaker) for speaker recognition. This method works very well when the training data is sufficient and it is in the same domain as that of the data which the speaker recognition is applied to (referred to as evaluation data), since the NN can learn the complex non-linear relations among both of the data in the domain.

As shown in FIG. 20, in training phase of NPL1, feature extraction unit 402 extracts a pair of feature vectors from DB 401 as the input layer of the NN (see FIG. 4 which indicates an example of NN) which are passive nodes, doing nothing but relaying the values from their single input to their multiple outputs. "Feature vector" in this description refers to a set of numerics (specific data) that represents a target object. "Target" or "non-target" as the output layer, which is determined by their corresponding speaker labels, is used as output layer. If their speaker labels are the same, it means they are from the same speaker and the output is "target". Otherwise, they are from different speakers and the output is "non-target". NN training unit 403 trains a NN using a long vector concatenated from the pair of feature vectors and the corresponding label of "target/non-target". Trained NN are stored in NN parameter storage 404. In the evaluation phase, feature extraction unit 402 extracts a pair of feature vectors from an enrollment speech data and a test speech data. NN verification unit 405 computes a score for the pair of feature vectors by using the trained NN in NN parameter storage 404. "Score" in this document refers to one kind of similarity measures in terms of a likelihood ratio of a pair of patterns being from the same class to being from different classes.

PTL1 discloses a technology that uses Time delay Neural Network (TDNN) and Multi-Layer perceptron (MLP) to verify speakers, under the consideration of loudness. A perceptron is an algorithm for supervised learning of binary classifiers (functions that can decide whether an input, represented by a vector of numbers, belongs to some specific class or not). A pattern of the frames whose loudness is with a pre-determined range, is extracted with TDNN according to pre-determined language units. Probability of each pattern of speech being from a registered speaker is calculated with MLP and averaged as the score.

NPL2 discloses a technology that uses a Denoising Auto Encoder (DAE) to transform a feature vector from microphone domain (out of target domain) to telephone domain (target domain), and then apply classic classifiers. This system can train the DAE well when the same data in different domains are available for training. This technology needs parallel data in training.

PTL 2 discloses a technology that calculates an acoustic diversity degree value and compensates feature vectors of short speech to comparable in reliability with that of speech of enough length. Similar to NPL2, this technology needs parallel data in training. It needs the same data in both long and short length. The short speech is a subset of the long one.

In addition, PTL 3, PTL 4, NPL 3 and NPL 4 disclose related technologies to the present invention.

CITATION LIST

Patent Literature

[PTL 1] International Publication WO03/015078
[PTL 2] United States Patent Application 2016/0098993
[PTL 3] Japanese Patent Laid-Open No. 2016-075740
[PTL 4] Japanese Patent Laid-Open (Translation of PCT Application) No. 2004-538526

Non Patent Literature

[NPL 1] D. Snyder, P. Ghahremani, D. Povey, D. Garcia-Romero, Y. Carmiel, S. Khudanpur, "Deep neural network-based speaker embeddings for end-to-end speaker verification", Spoken Language Technology Workshop (SLT), 2016 IEEE
[NPL 2] F. Richardson, B. Nemsick, D. Reynolds, "Channel compensation for speaker recognition using map adapted PLDA and denoising DNNs", Odyssey 2016, Jun. 21-24, 2016, Bilbao, Spain
[NPL 3] W. Campbell et al., "Support vector machines using GMM supervectors for speaker verification," IEEE Signal Processing Letters, Vol. 13, 308-311, 2006
[NPL 4] N. Dehak, R. Dehak, P. Kenny, N. Brummer, P. Ouellet, and P. Dumouchel, "Support vector machines versus fast scoring in the low-dimensional total variability space for speaker verification", Interspeech, inproceedings, Brighton, 2009-06-22.

SUMMARY OF INVENTION

Technical Problem

However, NPL1 cannot deal with domain mismatch problem. PTL1 takes loudness into consideration but simply uses it to select frames. It doesn't deal with domain variability either. In practice, training and evaluation data are often mismatched in domains. As a result, the relations accurately learned by NN is not suitable for evaluation data anymore, and it causes bad performance. NPL2 and extension of PTL2 can compensate feature vectors into another domain, but it is not applicable to all domain variety. They can work only if parallel recordings of speech data in different domains (transmission channel, speech length) are available. However, it is unrealistic in most of domain variability, such as language. Hence, such a method cannot compensate the domain variability well in practice.

In view of the above mentioned situation, the objective of the present invention is to provide classification robustness to any kind of domain variability.

Solution to Problem

In order to solve the above-mentioned problem, a first exemplary aspect of the present invention is a pattern recognition apparatus based on NN. The apparatus includes: NN training means for training an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets; and NN verification means for verifying a pair of second feature vectors in the specific domain to output whether the pair indicates same individual or not, based on a target domain vector and the NN parameters.

An second exemplary aspect of the present invention is a pattern recognition method using NN. The method includes: training an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets; and verifying a pair of second feature vectors in the specific domain to output whether the pair indicates same individual or not, based on a target domain vector and the NN parameters.

An third exemplary aspect of the present invention is a pattern recognition program using NN for causing a computer to recognize a pattern. The program includes: training an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets; and verifying a pair of second feature vectors in the specific domain to output whether the pair indicates same individual or not, based on a target domain vector and the NN parameters.

The program can be stored in a computer readable storage medium.

Advantageous Effects of Invention

According to the present invention, a pattern recognition apparatus, a pattern recognition method, and program of the present invention can provide classification robustness to any kind of domain variability.

BRIEF DESCRIPTION OF DRAWINGS

The drawings together with the detailed description, serve to explain the principles for the inventive adaptation method. The drawings are for illustration and do not limit the application of the technique.

Figure 1:
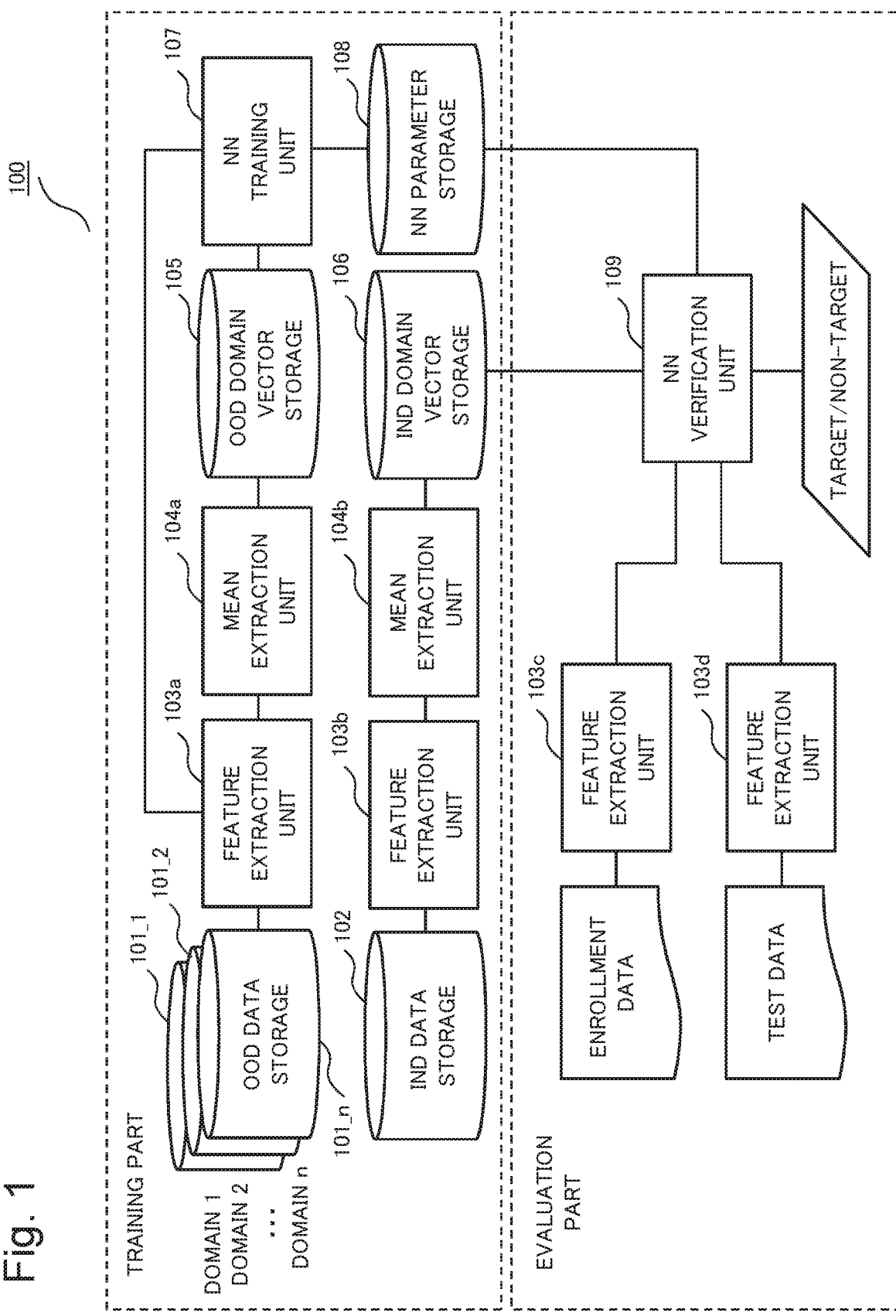
FIG. 1 is a block diagram of a pattern recognition apparatus of the first example embodiment in accordance with the present invention.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate example embodiments.

DESCRIPTION OF EMBODIMENTS

Each example embodiment of the present invention will be described below with reference to the figures. The following detailed descriptions are merely exemplary in nature and are not intended to limit the invention or the application and uses of the invention. Furthermore, there is no intention to be bound by any theory presented in the preceding background of the invention or the following detailed description.

NN has shown its power in a pattern recognition such as face recognition, speaker recognition and speech recognition. However, a NN-based pattern recognition is vulnerable to domain variability. Training a good NN needs a large amount of data in target domain, while data in target domain is hard to collect, especially those with labels. Therefore, there is a need for domain compensation without labeled data from target domain.

In the view of the above, our example embodiments utilize existing data of various domains to predict target domain vector, so as to be used in verification in addition to a pair of feature vectors of observations. Namely, by using domain information efficiency, verification performance can be robust against domain variability.

Target domain vectors, which represents the target domain, are predicted explicitly (embodiments 1 and 2) or implicitly (embodiment 3), using existing unlabeled data of various domains, including the target domain (embodiment 1), or not including the target domain (embodiments 2 and 3). "Domain vector" in this specification is referred to as a set of numerics that represents a domain. Therefore, the relation among domains is able to be learned, using such domain vectors in addition to feature vectors in modeling a verification NN. As a result, in a new domain, our example embodiments are able to achieve good and robust performance. In addition, IND data with labels is not mandatory in NN training. So it can be applied in any practical applications no matter how much IND data is available. If any amount of IND data is available, even without class labels, the robustness of system will be further enhanced. So compensation in any kind of domain variability can be provides. Hereinafter, our embodiments will be described.

First Example Embodiment

A pattern recognition apparatus of the first example embodiment can provide classification robustness to any kind of domain variability, using existing data of various domains, including the target domain, without domain label request and predicted domain vectors in NN. This is based on an assumption that domain variability results in a shift in feature space, which is often shown in a central tendency in features of the same domain. Thus, in this embodiment, "mean (average)" is used as a simple and direct representation for the domain variability.

<<Configuration of Pattern Recognition Apparatus>>

In the first embodiment of the present invention, a pattern recognition apparatus using mean feature vector as domain vector in NN will be described.

FIG. 1 illustrates a block diagram of pattern recognition apparatus 100 of the first embodiment. Pattern recognition apparatus 100 includes training part and evaluation part.

The training part includes OOD data storages 101_1, 101_2, . . . , 101_n (hereafter, described as 101_1-101_n. n represents the number of domain(s)), IND data storage 102, feature extraction unit 103a, 103b, mean extraction unit 104a, 104b, OOD domain vector storage 105, IND domain vector storage 106, NN training unit 107, NN parameter storage 108. The evaluation part includes feature extraction unit 103c, 103d and NN verification unit 109. Feature extraction unit 103a, 103b, 103c, 103d have the same function. Mean extraction unit 104a, 104b have the same function.

Figure 2:
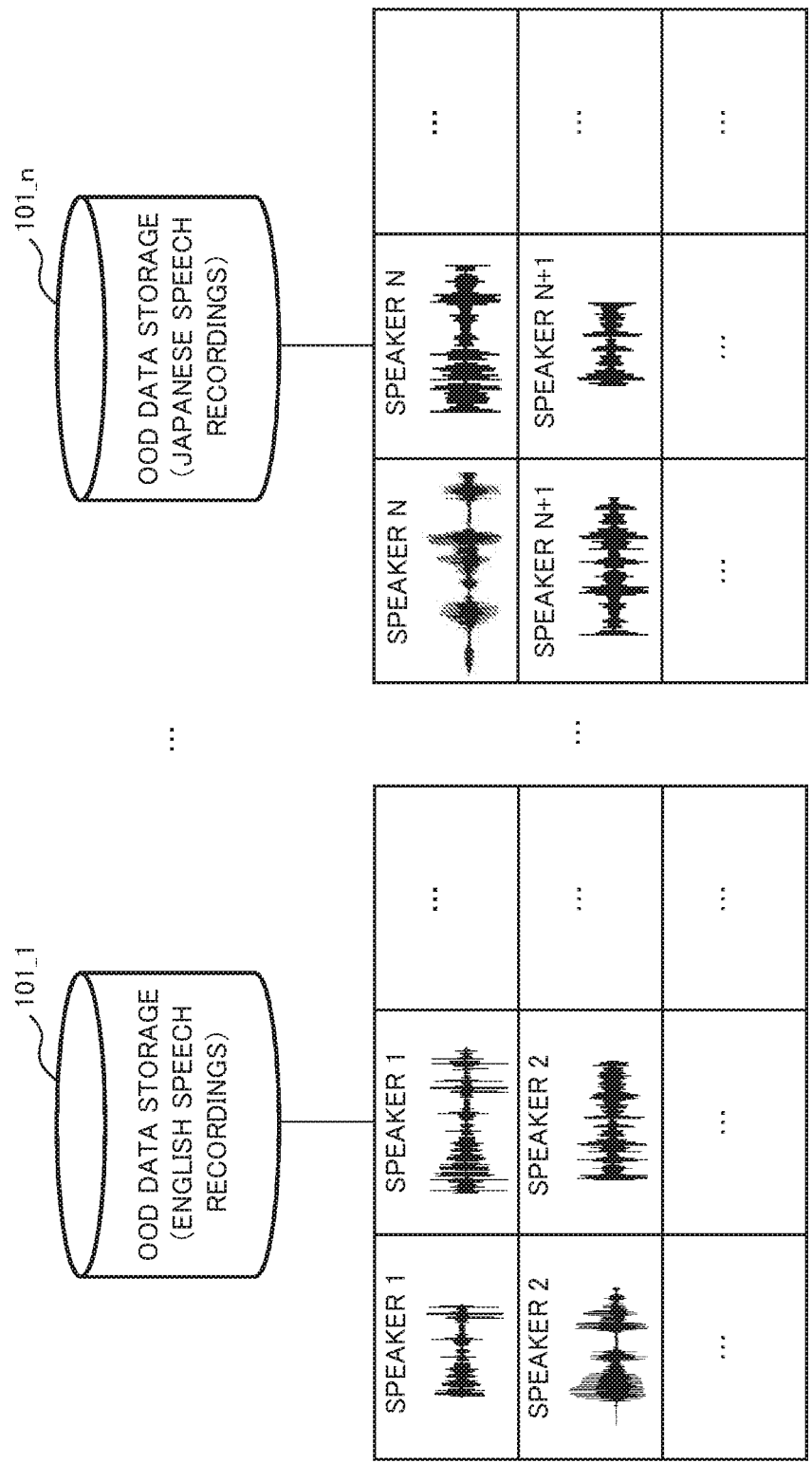
FIG. 2 shows an example of contents of OOD data storages.
Figure 3:
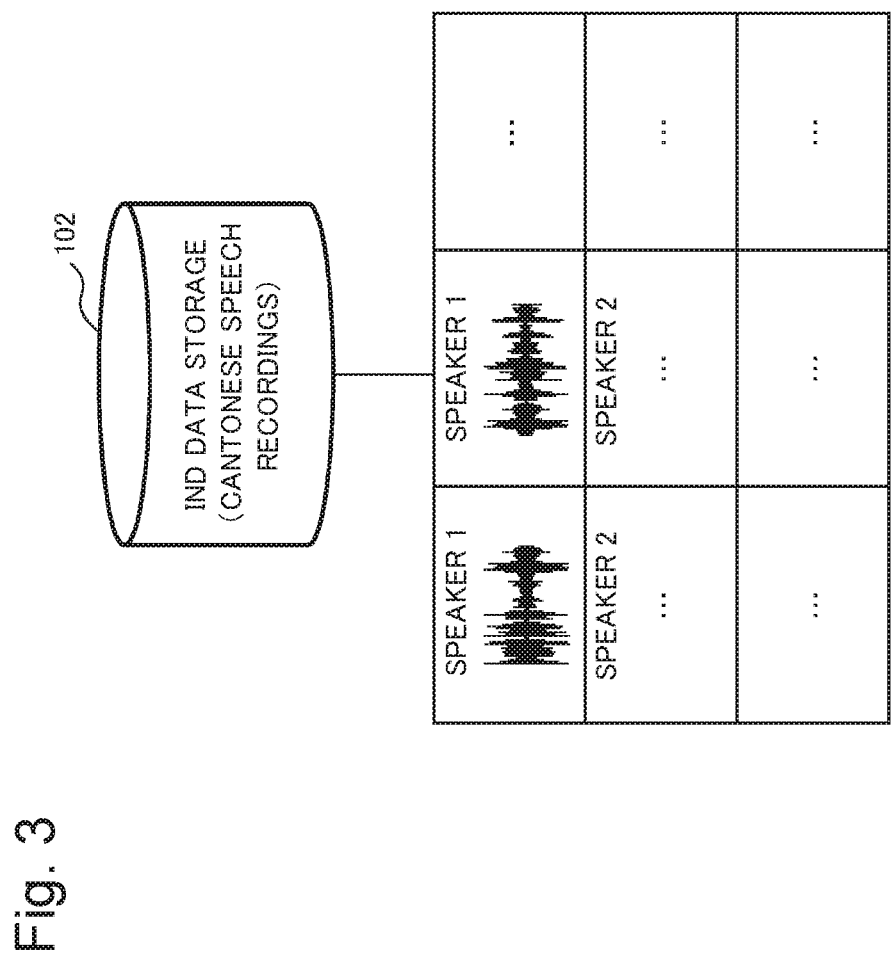
FIG. 3 shows an example of contents of an IND data storage.

OOD data storages 101_1-101_n store OOD data with class label from n (n is an integer greater than or equal to 1) domains. Contents of OOD data storages 101_1-101_n can be classified for each type of domains. For instance, as shown in FIG. 2, if the domain is "spoken language", OOD data storage 101_1 stores speech recordings of Domain type 1 (e.g. English), OOD data storage 101_n stores speech recordings of Domain type n (e.g. Japanese).

IND data storage 102 stores IND data with class label. Contents of IND data is classified for the same domain as the target one, which the verification is applied to. For example, the domain is "spoken language", and IND data storage 102 stores speech recordings of the target domain (e.g. Cantonese).

OOD domain vector storage 105 stores n mean vectors of feature vectors of the n domains, corresponding to the n OOD data storages 101_1-101_n. The features are individually-measurable properties of observations, for example, acoustic features such as Mel-Frequency Cestrum Coefficients (MFCC) in speech recognition. The mean vector is referred to as the centroid and the variance-covariance matrix as the dispersion or dispersion matrix. Referring to FIG. 2, a speech recording means an acoustic feature (shown as a graph, such as Speaker 1). Namely, in FIG. 2, OOD data storage 101_1 includes four speech recordings from two speakers. The "Speaker 1" can be a speaker label.

IND domain vector storage 106 stores the mean vector of feature vectors of the target domain, corresponding to the IND data storage 102. The features are individually-measurable properties of observations, for example, acoustic features such as MFCC.

NN parameter storage 108 stores trained NN parameters.

Feature extraction unit 103a extracts n sets of feature vectors from data in OOD data storages 101_1-101_n. Feature extraction unit 103b extracts feature vectors from data in IND data storage 102. For example, as described above, feature extraction unit 103a extracts a sequence of acoustic features of English speech from data in OOD data storage 101_1. In the same way, feature extraction unit 103a extracts acoustic features from speech of each language in OOD data storages 101_2, 101_3 . . . 101_n. Feature extraction unit 103b extracts a sequence of acoustic features from speech of target language (e.g. Cantonese), from each recordings of IND data storage 102.

Mean extraction unit 104a calculates mean feature vectors from n sets of the OOD features and store the result in OOD domain vector storage 105 as OOD domain vectors. For example, the mean extraction unit 104a calculates the mean over MFCCs from recordings in each of OOD storages 101_1-101_n. This is based on an assumption that domain variability results in a shift of feature vector distributions in feature space which refers to a space spanned by components of feature vectors. For example, if the OOD or IND data is about language, the distributions might be shifted in accord with the accent or phonemes used in the language. The results in the shift are often shown in a central tendency in features of the same domain. Thus, their mean can be used as a simple and direct representation for the domain variability.

Mean extraction unit 104b calculates a mean feature vector from the extracted IND feature vectors and stores the result in IND domain vector storage 106 as domain vectors. In other words, calculated mean feature vector become IND domain vector. For example, mean extraction unit 104b calculates the mean over plural MFCC (MFCCs) from recordings in IND data storage 102.

NN training unit 107 receives sets of OOD feature vectors from feature extraction unit 103a, and OOD domain vectors from OOD domain vector storage 105. NN training unit 107 trains a NN to determine target (e.g. speech segments from the same speaker) or non-target (e.g. speech segments from different speakers) with the received OOD feature vectors and OOD domain vectors. In this training, the received OOD feature vectors and OOD domain vectors are given to the input layer. And the "target/non-target" concluded from their speaker labels is given to the output layer. Details of those layers will be described later. For this purpose, a wide range of optimization techniques can be applied, for example, the gradient decent method, known as back propagation to minimize pre-defined cost functions, such as cross entropy. After the training, NN training unit 107 outputs NN parameters and stored them in NN parameter storage 108.

In the evaluation part, feature extraction unit 103c extracts feature vectors from an enrollment data and feature extraction unit 103d extracts feature vectors from a test data. Together with these data, NN verification unit 109 receives the domain vector of the target domain stored in IND domain vector storage 106 and the NN parameters stored in NN parameter storage 108. NN verification unit 109 calculates a verification score and determines the result of the calculation indicating whether the result shows "target" or "non-target", by comparing a pre-determined threshold. This threshold can be set by an engineer. In a typical case, the threshold is set as 0.5, since output neutron varies from 0 to 1. For example, if a verification score is greater than the threshold, it belongs to "target". If a verification score is equal to or less than the threshold, it belongs to "non-target". In this evaluation, "target" means the enrollment data and the test data are from the same individual, and "non-target" means they are from different individuals.

Figure 4:
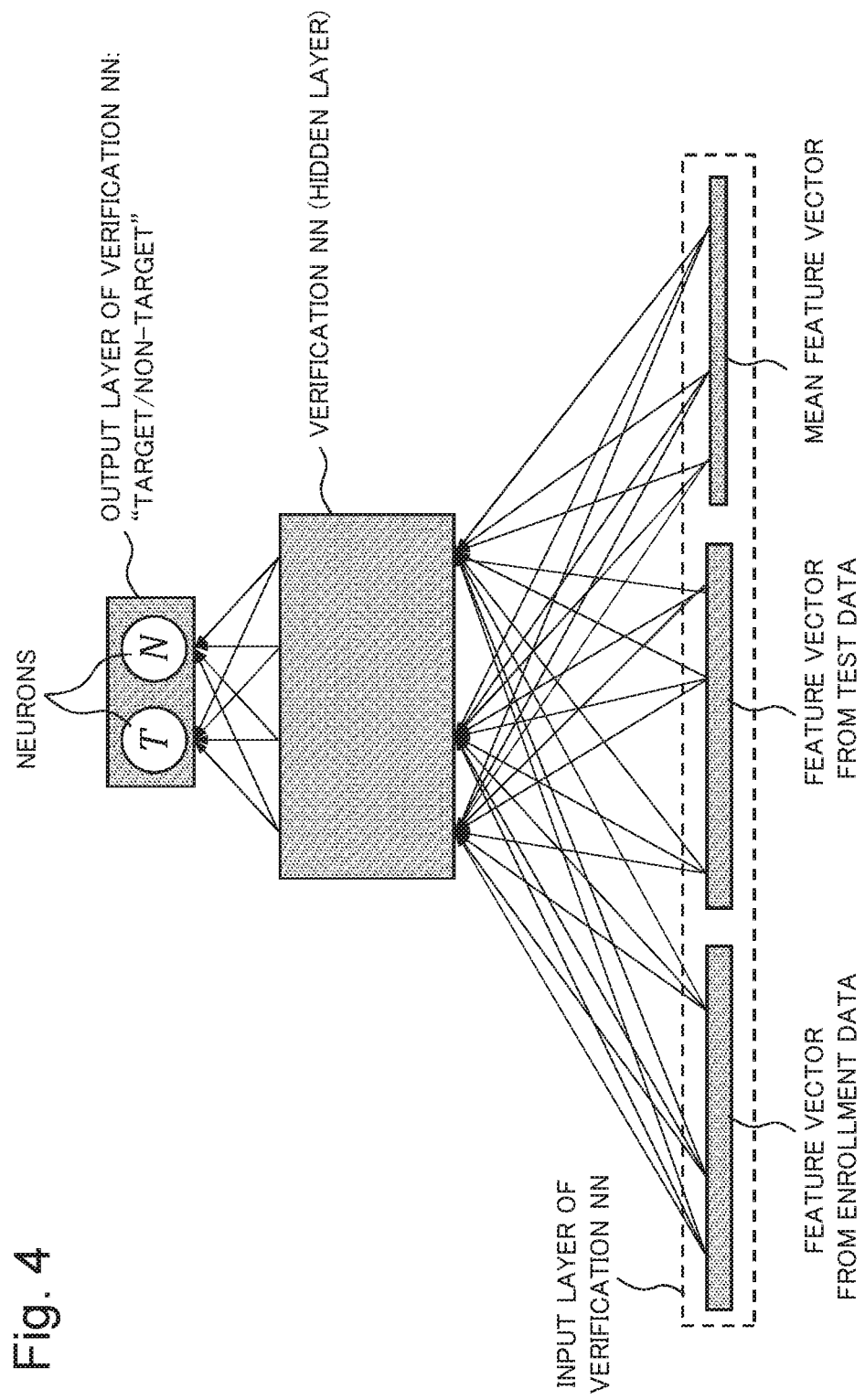
FIG. 4 shows a concept of NN architecture in the first example embodiment.

FIG. 4 shows a concept (model) of NN architecture. This model includes three types of layers: input, hidden and output. The hidden layer can be plural. There are a linear transformation and/or an activation (transfer) function at least between the input layer and the hidden layer(s), and between the hidden layer(s) and the output layer.

In the training part, both the input layer (accepting vectors) and the output layer (outputting "target/non-target") are provided, and as a result, the hidden layer(s) (NN parameters) are obtained.

In the evaluation part, the input layer and the hidden layer(s) are provided, and as a result, the output layer is obtained.

In this model, the output layer consists of two neurons. In the training part, the neutrons can take a value "1" or "0" corresponding to the "target/non-target".

In the evaluation part, the neurons are posteriors of "target" or "non-target".

In the training part and evaluation part, the input layer receives three vectors: a feature vector extracted from the enrollment data; a feature vector extracted from the test data; and the mean feature vector from IND domain vector storage 106.

In the evaluation part, each of the hidden layer(s) receives outputs of the previous layer (the input layer or an immediately prior hidden layer). Based on the outputs, a linear transformation and activation function (such as sigmoid function) are calculated. The activation vector can be calculated by the activation function such as:

$$v^l = f(W^l v^{l-1} + b^l), \text{ for } 0 < l < L \qquad (1)$$

wherein, 1 is level of the NN which shows a layer deepness from the input layer to the output layer. "l=0" means the input layer, and "l=L" means the output layer. "0<l<L" represents the hidden layer(s). $v^{l-1}$ is an activation vector from level l−1, and $v^l$ is an activation vector at level l. $W^l$ and $b^l$ are a weight matrix and a bias vector at level l. f( ) is an activation function. Activation vector of one layer is generally obtained by combination of the linear transformation and the activation function, based on the activation vector of the previous layer. The calculation results are sent to the next layer. The next layer repeats the same calculation again based on the obtained NN parameters.

Finally, in the evaluation part, a result of the verification is obtained as the values of the two neurons indicating whether "target" or "non-target" in the output layer. "Target" means the enrollment data and the test data are from the same individual, and "Non-target" means they are from different individuals.

<<Operation of Pattern Recognition Apparatus>>

Next, the operation of pattern recognition apparatus 100 will be described with reference to drawings.

Figure 5:
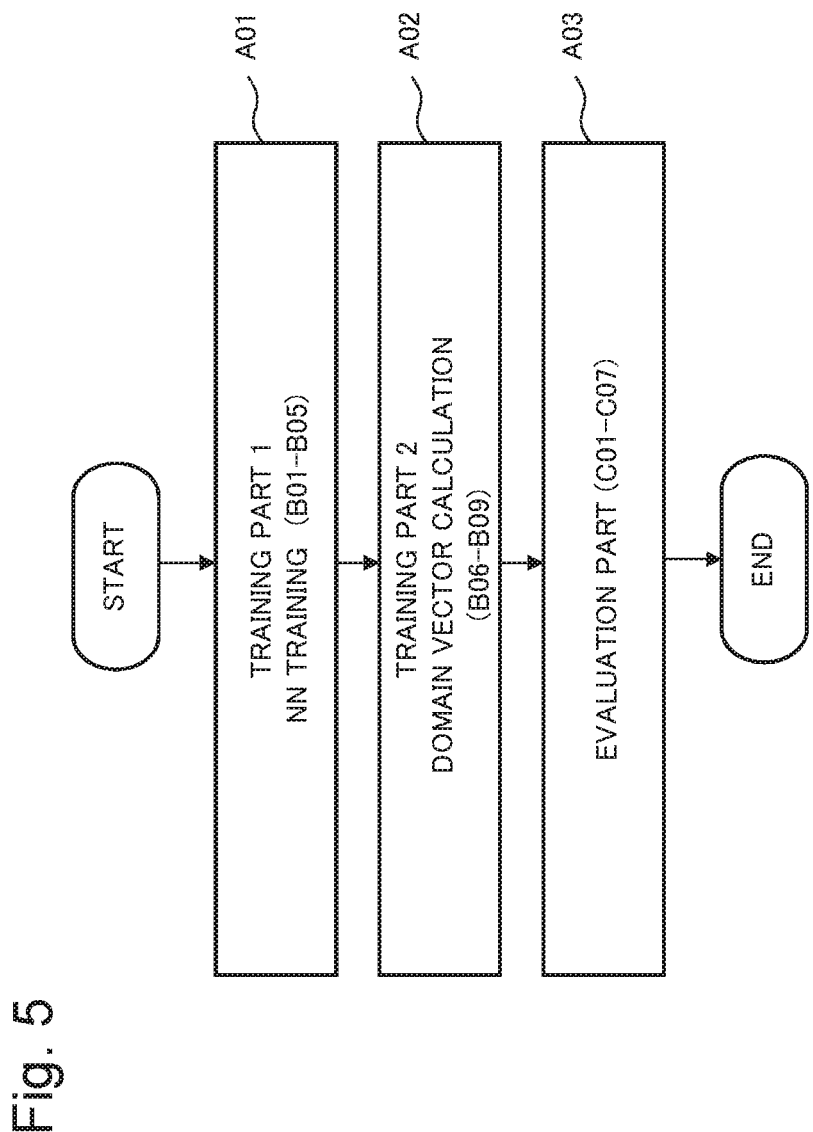
FIG. 5 is a flowchart illustrating operation of the pattern recognition apparatus of the first example embodiment.

The whole operation of pattern recognition apparatus 100 will be described by referring to FIG. 5. FIG. 5 contains operations of the training part and the evaluation part. However, this shows an example, the operations of the training and the evaluation can be executed continuously or time intervals can be inserted.

In step A01 (training part 1), NN verification unit 109 is trained based on mean of each OOD domain vector stored in OOD domain vector storage 105. For this training, a wide range of optimization techniques can be applied, for example, the gradient decent method, known as back propagation to minimize pre-defined cost functions, such as cross entropy. As a result of the training, NN parameters are generated and stored in NN parameter storage 108.

In step A02 (training part 2), mean of IND domain vector is calculated based on IND data feature vectors and stored in IND domain vector storage 106.

In step A03 (evaluation part), NN verification unit 109 calculates the posteriors of two input data (an enrollment data and a test data) for the two neurons of "target" and "non-target" in the output layer using NN parameter stored in NN parameter storage 108 based on IND domain vector stored in IND domain vector storage 106.

Figure 6:
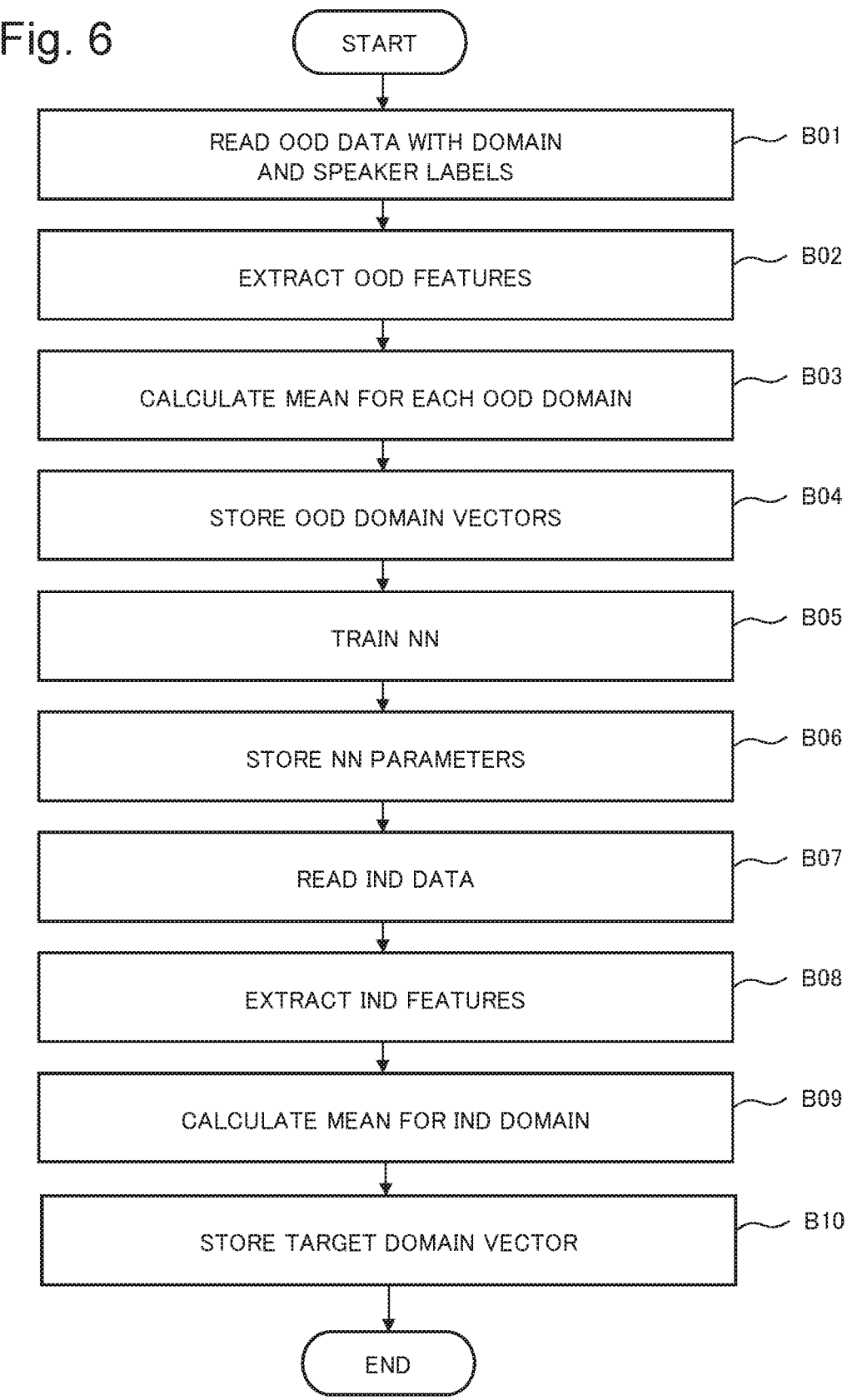
FIG. 6 is a flowchart illustrating operation of the training phase of the pattern recognition apparatus of the first example embodiment.

FIG. 6 is a flowchart illustrating that verification NN is trained using domain vectors averaged from all feature vectors of the domains. FIG. 6 shows the training part 1 and 2 in FIG. 5.

First, in step B01, as the beginning of training part 1, feature extraction unit 103a reads OOD data with domain (e.g. language) and speaker labels (e.g. Speaker 1) from each of OOD data storages 101_1-101_n.

In step B02, feature extraction unit 103a further extracts n sets of feature vectors from OOD data storages 101_1-101_n. For example, feature extraction unit 103a extracts a sequence of MFCCs, as the feature vectors, from each of speech recording of OOD data storages 101_1-101_n.

In step B03, mean extraction unit 104a calculates mean vectors from the feature vectors corresponding to each domain. As described above, mean extraction unit 104a calculates the mean vector over MFCCs of speech recording of each OOD domain (e.g. English speech, Japanese speech).

In step B04, mean extraction unit 104a stores the calculated OOD mean vectors in OOD domain vector storage 105.

In step B05, NN training unit 107 trains a verification NN using OOD feature vectors sent from feature extraction unit 103a and OOD domain vectors acquired from OOD domain vector storage 105, with speaker labels (e.g. Speaker 1).

In step B06, as a result of the training, NN training unit 107 generates NN parameters and store them in NN parameter storage 108. This is the end of training part 1.

In step B07, as the beginning of training part 2, feature extraction unit 103b reads IND data from IND data storage 102.

In step B08, feature extraction unit 103b extracts feature vectors from the IND data. For example, feature extraction unit 103b extracts a sequence of MFCCs from each of speech recordings of IND data storage 102.

In step B09, mean extraction unit 104b calculates the mean vector from the feature vectors corresponding to the IND data. For example, mean extraction unit 104b calculates the mean over MFCCs of speech recordings of IND domain.

In step B10, mean extraction unit 104b further stores the calculated IND domain vector in IND domain vector storage 106. For example, mean extraction unit 104b calculates the mean over MFCCs of speech recordings of IND domain.

Note that the order of B01-B06 and B07-B10 can be switched, not limited to the form presented in FIG. 6.

Figure 7:
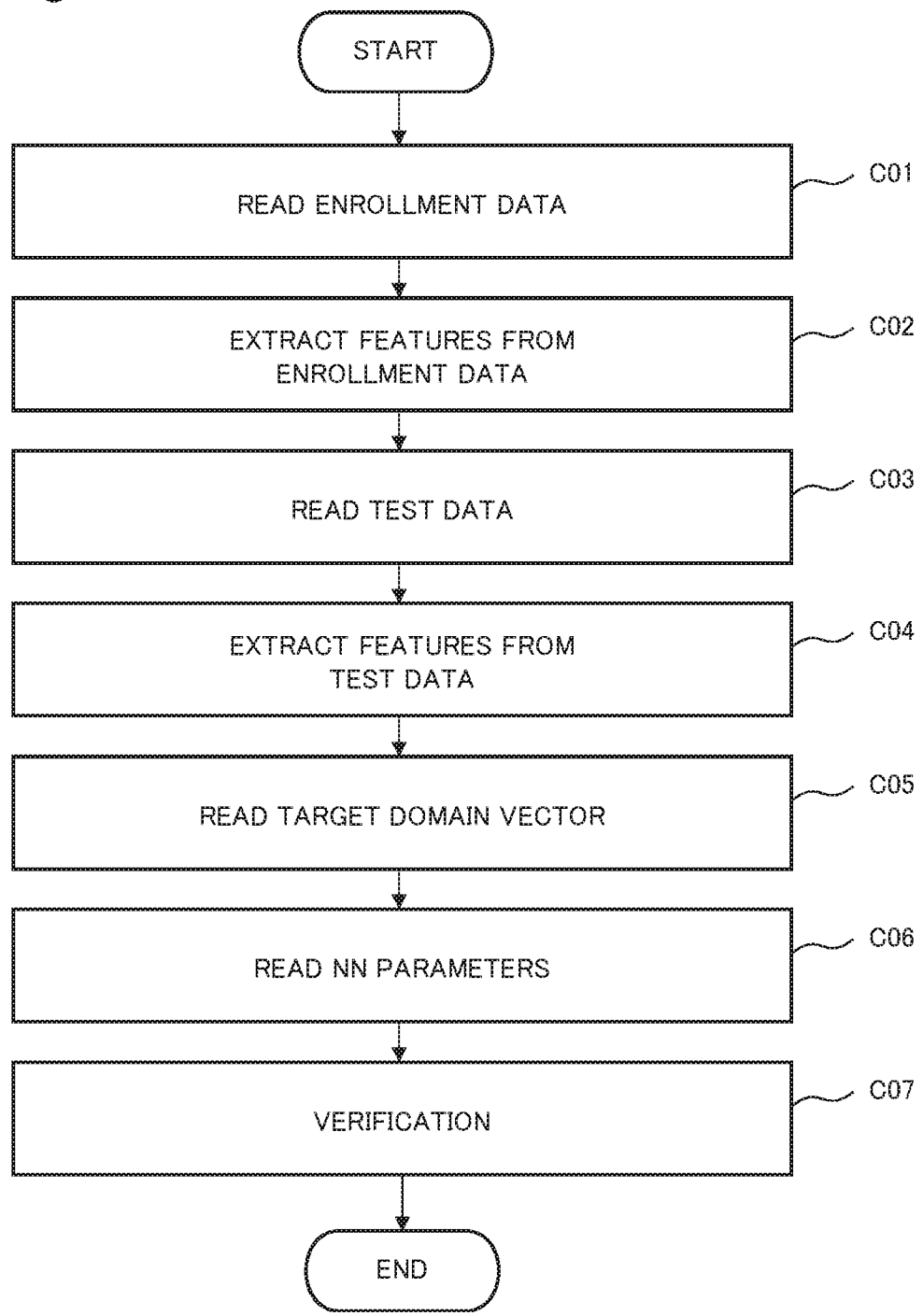
FIG. 7 is a flowchart illustrating operation of the evaluation phase of the pattern recognition apparatus of the first example embodiment.

FIG. 7 is a flowchart illustrating an evaluation phase of NN verification using a domain vector averaged from all the feature vectors from the target domain.

Firstly, in step C01, feature extraction unit 103c reads enrollment data (basic data, such as speech recordings) inputted from an external device (not shown in FIG. 1)

In step C02, feature extraction unit 103c extracts feature vectors from the enrollment data. For example, the enrollment data is Cantonese speech recordings. Feature extraction unit 103c extracts sequences of MFCCs of the Cantonese speech recordings.

In step C03, feature extraction unit 103d reads a test data (such as a speech) inputted from an external device (not shown in FIG. 1).

In step C04, feature extraction unit 103d extracts feature vectors from the test data. For example, the test data is a Cantonese speech recording. Feature extraction unit 103d extracts a sequence of MFCCs of the Cantonese speech recording, and transforms the extracted data into a fixed dimensional feature vector, for example, i-vector (for details, see NPL 2).

Note here the order of C01-C02 and C03-C04 can be switched.

In step C05, NN verification unit 109 reads the target domain vector stored in IND domain vector storage 106.

In step C06, NN verification unit 109 reads NN parameters stored in NN parameter storage 108.

In step C07, NN verification unit 109 calculates a verification score by using the NN model shown in FIG. 4 and applying the equation (1), and gives an answer, namely, "target" or "non-target" by comparing the verification score with a pre-determined threshold.

Representation of domain vectors is not limited to the mean of feature vectors. For example, taking the mean as a 1st-order statistics, other statistics (2nd-, 3rd- . . . order statistics) can be used. Another option for the statistics can be so-called Gaussian Mixture Model (GMM), Gaussian Super vectors (GSV), which are calculated from weights, means and variances of a GMM estimated from the dataset obtained from OOD data storages 101_1-101_n and IND data storage 102. Yet another option can be so-called i-vector.

Effect of First Example Embodiment

As explained above, the first example embodiment can improve the robustness of verification NN. The reason is that NN training unit 107 trains an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets, and, NN verification unit 109 verifies a pair of second feature vectors in the specific domain to output whether the pair indicates same individual or not, based on a target domain vector and the NN parameters.

In this embodiment, a mean is used as a simple and direct representation for the domain variability. This is based on an assumption that domain variability results in a shift in feature space, which is often shown in a central tendency in feature vectors of the same domain.

Second Example Embodiment

In the first example embodiment, pattern recognition apparatus 100 can improve the robustness of verification NN. However, it needed a certain amount of data in the target domain (IND data) from which the domain vector (mean vector) is extracted, although domain labels are not required. So it can be applied only when the target domain data is available.

The second example embodiment of the present invention can provide classification robustness to any kind of domain variability. A pattern recognition apparatus of the second example embodiment predicts target domain vectors that represents the target domain, using existing data of various domains without IND data, by using MLP. The MLP is a feed-forward artificial neural network model that maps sets of input data onto a set of appropriate outputs, which is good at creating mathematical models for categorical variables. Thus, in this embodiment, the MLP trained with data of various domains is capable of predicting a domain vector of the target domain.

<<Configuration of Pattern Recognition Apparatus>>

In the second example embodiment of the present invention, a pattern recognition apparatus predicts a target domain using a bottleneck feature vector extracted by MLP in NN. The bottleneck features are made by NN hidden layer which structures smaller number nodes than other layer. The structure of the bottleneck can extract normal features and bottleneck features representing phoneme essential features. Therefore, in this embodiment, the bottleneck feature extracted from MLP is treated as a target domain feature.

Figure 8:
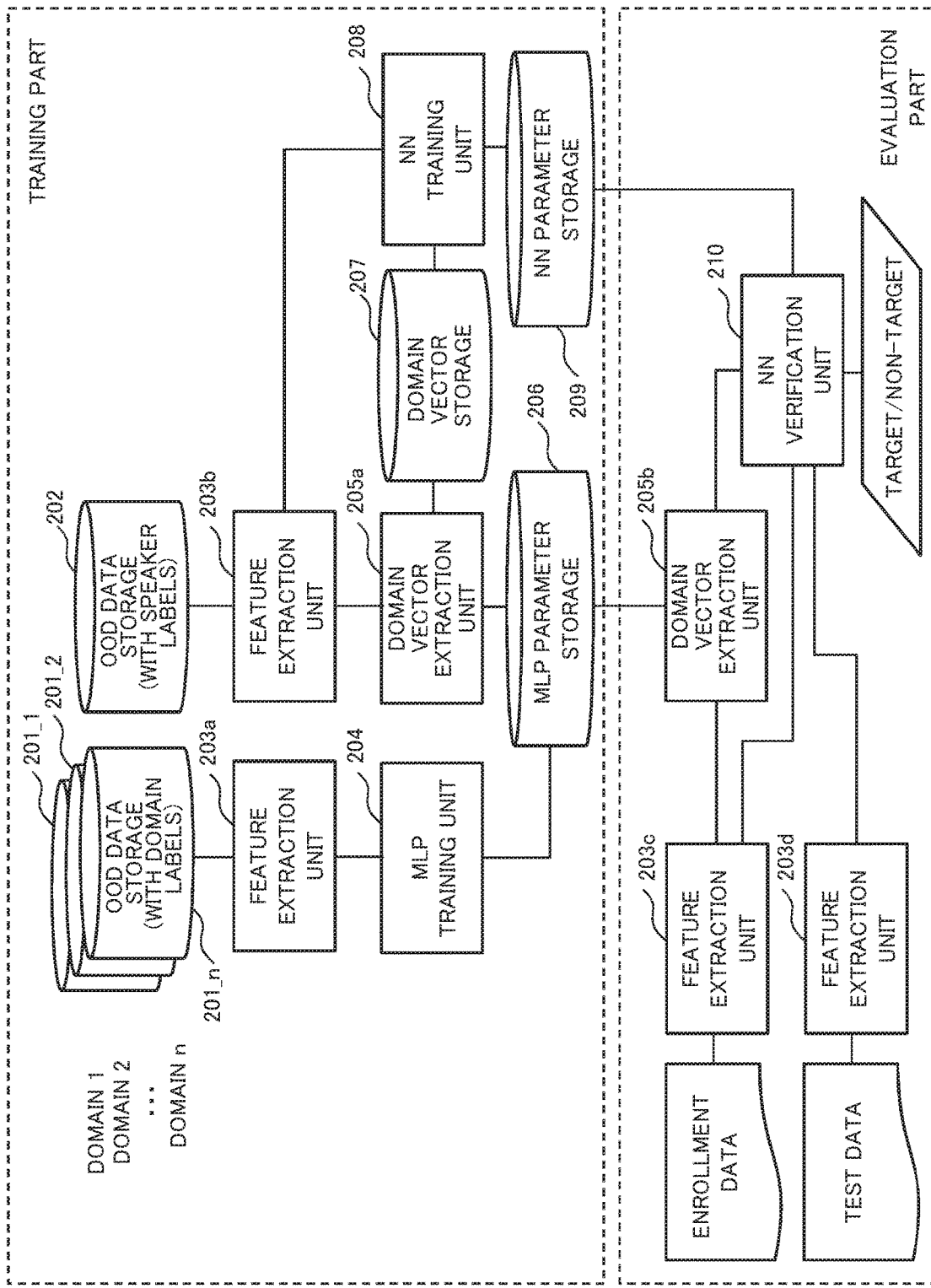
FIG. 8 is a block diagram of a pattern recognition apparatus of the second example embodiment in accordance with the present invention.

FIG. 8 illustrates a block diagram of pattern recognition apparatus 200 of the second example embodiment. Pattern recognition apparatus 200 includes training part and evaluation part.

The training part includes OOD data storages 201_1, 201_2, . . . 201_n (hereafter, described as 201_1-201_n), OOD data storage 202, feature extraction unit 203a, 203b, MLP training unit 204, domain vectors extraction unit 205a, MLP parameter storage 206, domain vector storage 207, NN training unit 208, NN parameter storage 209. The evaluation part includes feature extraction unit 203c, 203d, domain vector extraction unit 205b, and NN verification unit 210.

OOD data storages 201_1-201_n store OOD data from n (n is an integer greater than or equal to 1) domains with corresponding domain labels. Contents of OOD data storages 201_1-201_n can be classified for each type of domains. For instance, as shown in FIG. 2, if the domain is "spoken language", OOD data storage 201_1 stores speech recordings of Domain type 1 (e.g. English), OOD data storage 201_n stores speech recordings of Domain type n (e.g. Japanese).

OOD data storage 202 stores OOD data with speaker labels. Contents of OOD data storage 202 can be classified for speaker's domain. OOD data storages 201_1-201_n and OOD data storage 202 can hold the same data (such as, same speakers in the same domain) or different data (such as, different speakers in the same domain). If a large-scale data with speaker labels and domain labels is available, then it can be used for both of storages. However, IND data is not essential. In this embodiment, for easy understanding, one of OOD data storages 201_1-201_n should hold the same domain data of OOD data storage 202, however the speakers can be different.

MLP parameter storage 206 stores trained MLP parameters.

Domain vector storage 207 stores n domain vectors (n IND vectors), corresponding to the n OOD data storages 201_1-201_n. The domain vectors are calculated based on MLP parameters stored in MLP parameter storage 206.

NN parameter storage 209 stores trained NN parameters.

Feature extraction 203a extracts n sets of feature vectors from data in OOD data storages 201_1-201_n. Feature extraction unit 203b extracts feature vectors from speech recordings with speaker labels in OOD data storage 202. MLP training unit 204 receives sets of OOD feature vectors from feature extraction unit 203a and trains an MLP. After the training, MLP training unit 204 outputs MLP parameters (domain vectors) and stores them in MLP parameter storage 206.

Figure 9:
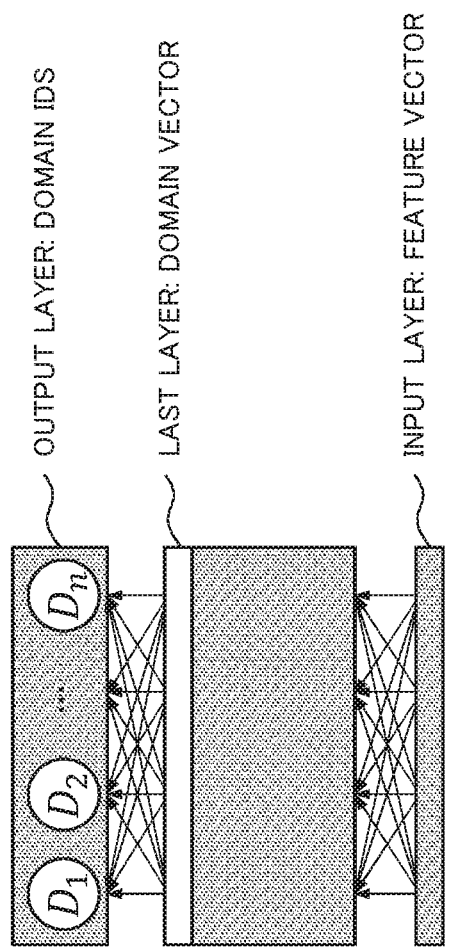
FIG. 9 shows a concept of MLP architecture in the second embodiment.

FIG. 9 shows a concept (model) of MLP architecture. Referring to FIG. 9, MLP stands for multi-layer perception which is a kind of neural networks. MLP receives feature vectors in the input layer, and outputs domain IDs (domain vectors) from the output layer. In MLP, the last layer which is closest to the output layer is expected as the feature vector which can represent the domains, namely, it shows domain vectors. For this training, a wide range of optimization techniques can be applied, for example, the gradient decent method, known as back propagation to minimize pre-defined cost functions, such as cross entropy.

Domain vector extraction 205a obtains MLP parameters from MLP parameter storage 206. Domain vector extraction unit 205a extracts domain vectors from a bottle-neck feature vector in MLP parameters. Domain vector extraction 205a obtains feature vectors with speaker labels from feature extraction unit 203b. Domain vector extraction unit 205a stores the domain vectors with domain labels and the corresponding feature vectors with speaker labels in domain vector storage 207, such as "Speaker 1" in "English Domain".

NN training unit 208 receives sets of OOD feature vectors with speaker labels from feature extraction unit 203b and searches corresponding domain vectors from domain vector storage 207. NN training unit 208 trains a NN based on the feature vectors and the domain vectors. After the training, NN training unit 208 outputs NN parameters and stores them in NN parameter storage 209.

In the evaluation part, feature extraction unit 203c extracts a feature vector from an enrollment data and feature extraction unit 203d extracts a feature vector from a test data. Domain vector extraction unit 205b receives the feature vector of the enrollment data from feature extraction unit 203c, and MLP parameters from MLP parameter storage 206. Domain vector extraction unit 205b extracts a target domain vector based on the feature vector and the domain vector.

Together with the feature vectors of the enrollment data and testing data from feature extraction units 203c, 203d, NN verification unit 210 receives the target domain vector from domain vector extraction unit 205b, and the NN parameters stored in NN parameter storage 209. NN verification unit 210 calculates a verification score by using the NN model shown in FIG. 9 and applying the equation (1). NN verification unit 210 determines the result of calculation, namely, outputs whether the result indicates "target" or "non-target", by comparing a pre-determined threshold. "Target" means the enrollment data and the test data are from the same individual, and "Non-target" means they are from different individuals.

<<Operation of Pattern Recognition Apparatus>>

Next, the operation of pattern recognition apparatus 200 will be described with reference to drawings.

Figure 10:
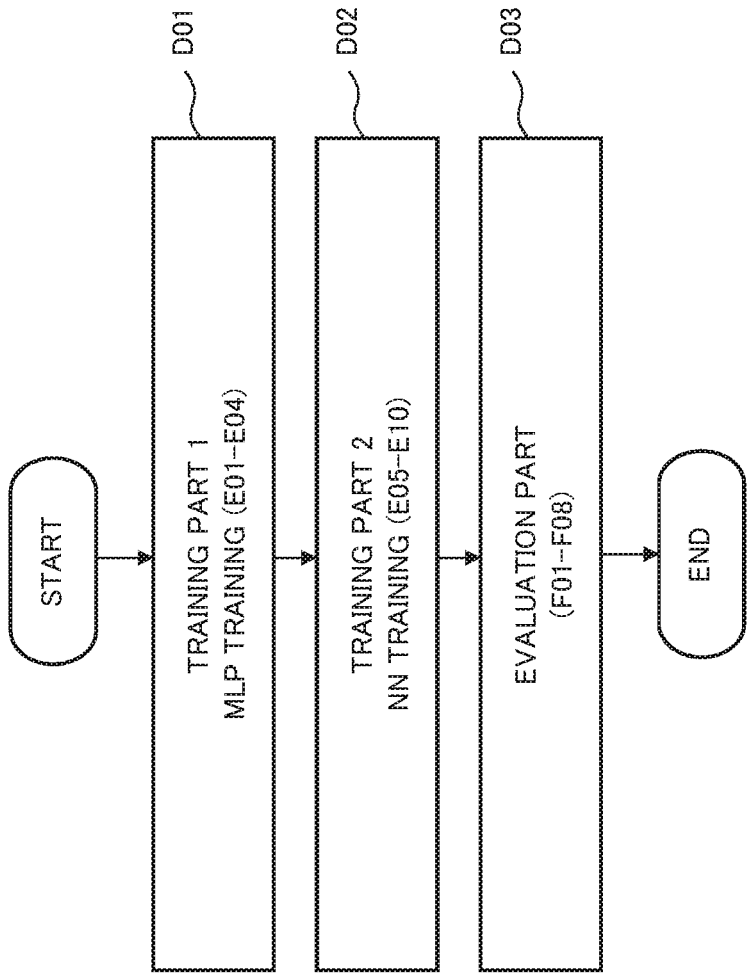
FIG. 10 is a flowchart illustrating operation of the pattern recognition apparatus of the second example embodiment.

The whole operation of pattern recognition apparatus 200 will be described by referring to FIG. 10. FIG. 10 contains operations of the training part and the evaluation part. However, this shows an example, the operations of the training and the evaluation can be executed continuously or time intervals can be inserted.

In step D01 (training part 1), MLP training unit 204 trains a MLP for obtain domain vectors. For this training, a wide range of optimization techniques can be applied, for example, the gradient decent method, known as back propagation to minimize pre-defined cost functions, such as cross entropy. As a result of the training, MLP parameters are generated and stored in MLP parameter storage 206.

In step D02 (training part 2), NN training unit 208 is trained based on domain vectors in domain vector storage 207, corresponding to n sets of OOD data. For this training, a wide range of optimization techniques can be applied, for example, the gradient decent method, known as back propagation to minimize pre-defined cost functions, such as cross entropy. As a result of the training, NN parameters are generated and stored in NN parameter storage 209.

In step D03 (evaluation part), domain vector extraction unit 205b calculates a target domain vector based on MLP parameter in MLP parameter storage 206. NN training unit 208 verifies input two data (an enrollment data and a test data), based on the target domain vector and NN parameters stored in NN parameter storage 209, and outputs the verification result, namely, the test data is "target" or "non-target".

Figure 11:
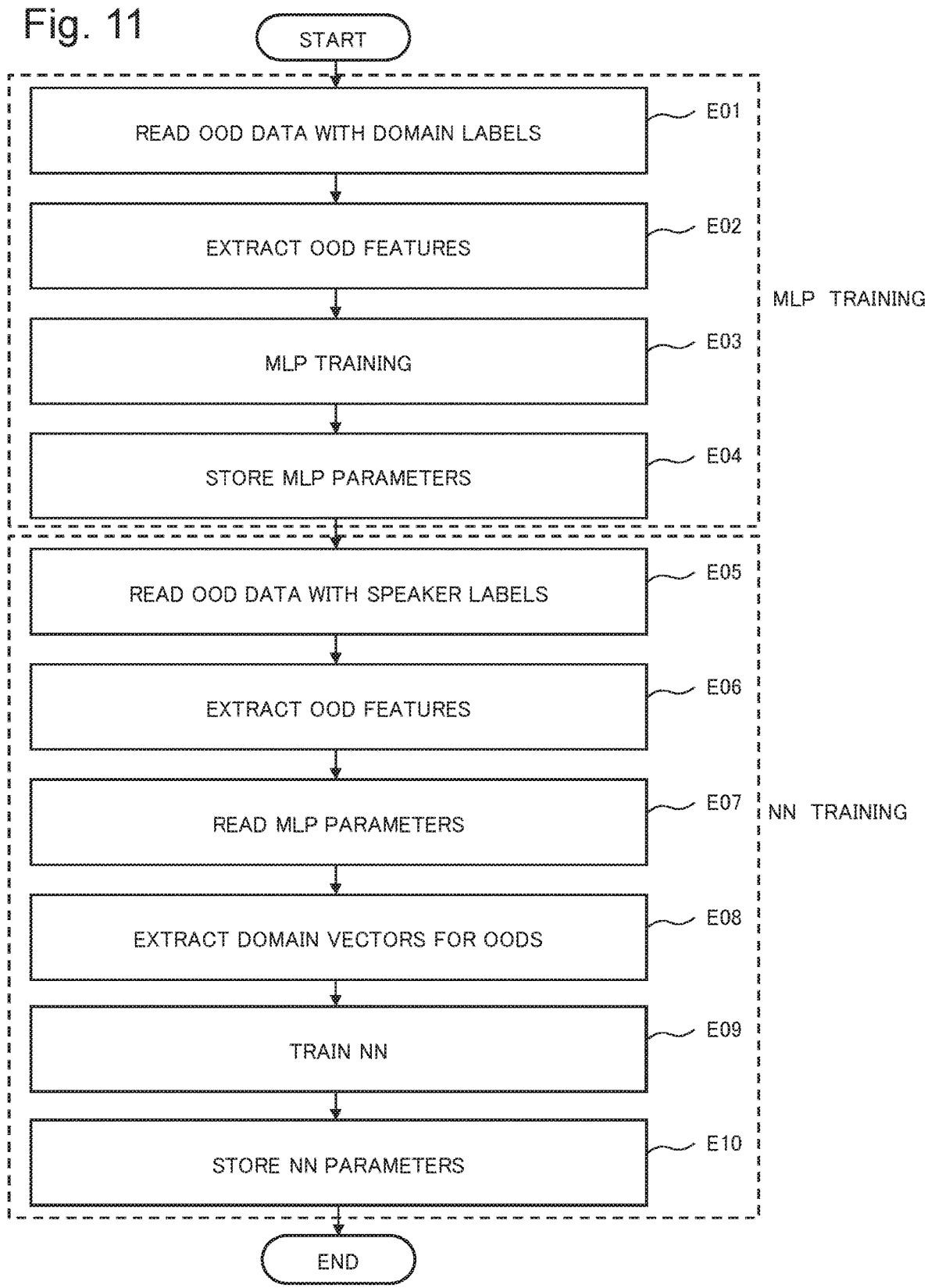
FIG. 11 is a flowchart illustrating operation of the training phase of the pattern recognition apparatus of the second example embodiment.

FIG. 11 is a flowchart illustrating that verification NN is trained using domain vectors made by MLP trained with data of various domain. This shows the training part 1 and 2 (steps D01 and D02) in FIG. 10.

First, in step E01, as the beginning of training part 1, feature extraction unit 203a reads OOD data with domain labels (e.g. languages) from OOD data storages 201_1-201_n.

In step E02, feature extraction unit 203a extracts n sets of feature vectors from OOD data storages 201_1-201_n. For example, feature extraction unit 203a extracts a sequence of MFCCs, as the feature vectors, from each of speech recording of OOD data storages 201_1-201_n.

In step E03, MLP training unit 204 trains an MLP using these feature vectors and the domain labels (e.g. English speech, Japanese speech).

In step E04, as a result of the training, MLP training unit 204 generates MLP parameters (domain vectors) and stores them in MLP parameter storage 206. This is the end of training part 1.

In step E05, as the beginning of training part 2, feature extraction unit 203b reads OOD data with speaker labels (e.g. speaker 1) from OOD data storage 202.

In step E06, feature extraction unit 203b extracts feature vectors from the OOD data. For example, feature extraction unit 203b extracts a sequence of MFCCs, as the feature vectors, from each of speech recording of OOD data storage 202.

In step E07, domain vector extraction unit 205a reads MLP parameters from MLP parameter storage 206.

In step E08, domain vector extraction unit 205a extracts a domain vector for each domain (e.g. English speech, Japanese speech) corresponding to OOD data in OOD data storage 202.

In step E09, NN training unit 208 trains a verification NN based on OOD feature vectors with speaker labels sent from feature extraction unit 203b and domain vectors acquired from domain vector storage 207 with speaker labels (e.g. Speaker 1)

In step E10, as a result of the training, NN training unit 208 generates NN parameters and stores them in NN parameter storage 209.

Figure 12:
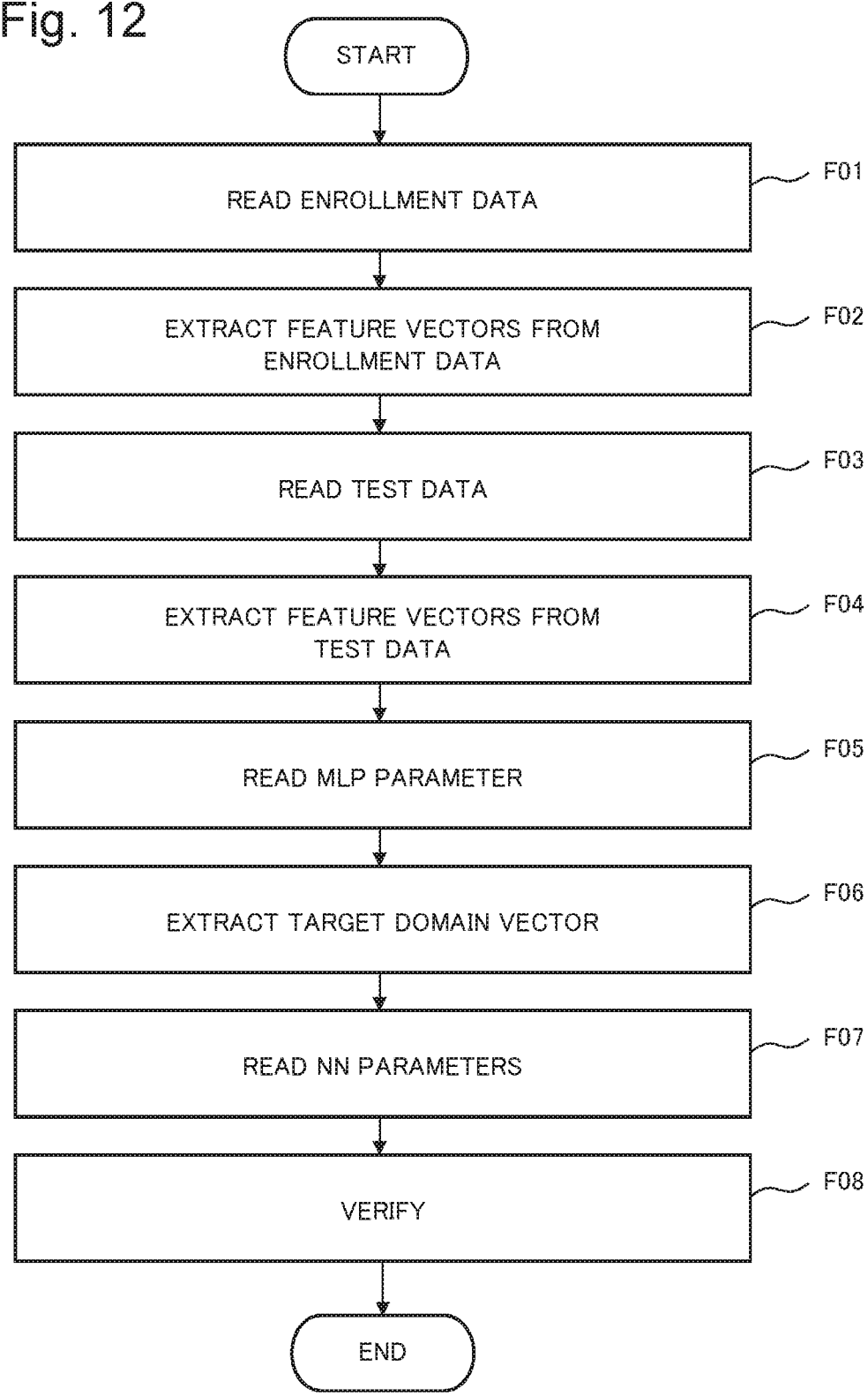
FIG. 12 is a flowchart illustrating operation of the evaluation phase of the pattern recognition apparatus of the second example embodiment.

FIG. 12 is a flowchart illustrating that the evaluation part of NN verification using a domain vector made by MLP, shown in FIG. 9.

Firstly, in step F01, feature extraction unit 203c reads an enrollment data (basic data) inputted from an external device (not shown in FIG. 8).

In step F02, feature extraction unit 203c extracts feature vectors from the enrollment data. For example, the enrollment data is Cantonese speech recordings. Feature extraction unit 203c extracts a sequence of MFCCs of the Cantonese speech recordings.

In step F03, feature extraction unit 203d reads a test data inputted from an external device (not shown in FIG. 8).

In step F04, feature extraction unit 203d extracts feature vectors from the test data. For example, the test data is a Cantonese speech recording. Feature extraction unit 203d extracts a sequence of MFCCs of the Cantonese speech recording.

Note here the order of F01-F02 and F03-F04 can be switched.

In step F05, domain vector extraction unit 205b reads MLP parameters stored in MLP parameter storage 206.

In step F06, domain vector extraction unit 205b extracts a target domain vector from the feature vector of the enrollment data.

In step F07, NN verification unit 210 reads NN parameters stored in 209.

In step F08, together with the feature vectors of the enrollment data and testing data from feature extraction unit 203c, 203d, NN verification unit 210 receives the target domain vector from domain vector extraction unit 205b, and the NN parameters stored in NN parameter storage 209. NN verification unit 210 calculates a verification score by using the NN model (MLP) shown in FIG. 9 by applying the equation (1). NN verification unit 210 determines the result of calculation indicating whether "target" or "non-target" by comparing a pre-determined threshold. "Target" means the enrollment data and the test data are from the same individual, and "Non-target" means they are from different individuals.

The layer where bottleneck feature vectors are extracted is not limited to the last layer of the MLP. It is possible to extract them from the second last layer or even earlier layers as is commonly done on the use of bottleneck feature vectors. In the evaluation part, test data can also be used for domain data extraction.

Effect of Second Example Embodiment

As explained above, the second example embodiment can improve the robustness of verification NN against any kind of domain variability, without any data of the target domain needed in the training. The second example embodiment is more applicable in practice, especially it is useful in the case when any IND data is extremely hard to collect. The reason is a neural network MLP is trained, which can extract domain vector from one or more feature vectors. The domain vectors are added in verification training, so that domain is considered in classification and the results are more robust.

Third Example Embodiment

The second example embodiment can improve the robustness of verification NN against any kind of domain variability, without any data of the target domain needed in the training. In addition, the third example embodiment of the present invention can provide classification robustness to any kind of domain variability, by the joint process of prediction of target domain vectors and domain classification, using existing data of various domains without target domain information, based on domain information in NN. Jointly training of MLP and verification NN enables the training to achieve the wide range of optimization.

<<Configuration of Pattern Recognition Apparatus>>

In the third example embodiment of the present invention, a pattern recognition apparatus training a domain vector extraction MLP and verification NN simultaneously will be described. The pattern recognition apparatus of this embodiment requires a large amount of OOD data which has both speaker labels and domain labels for training, compared to the first and second embodiment.

Figure 13:
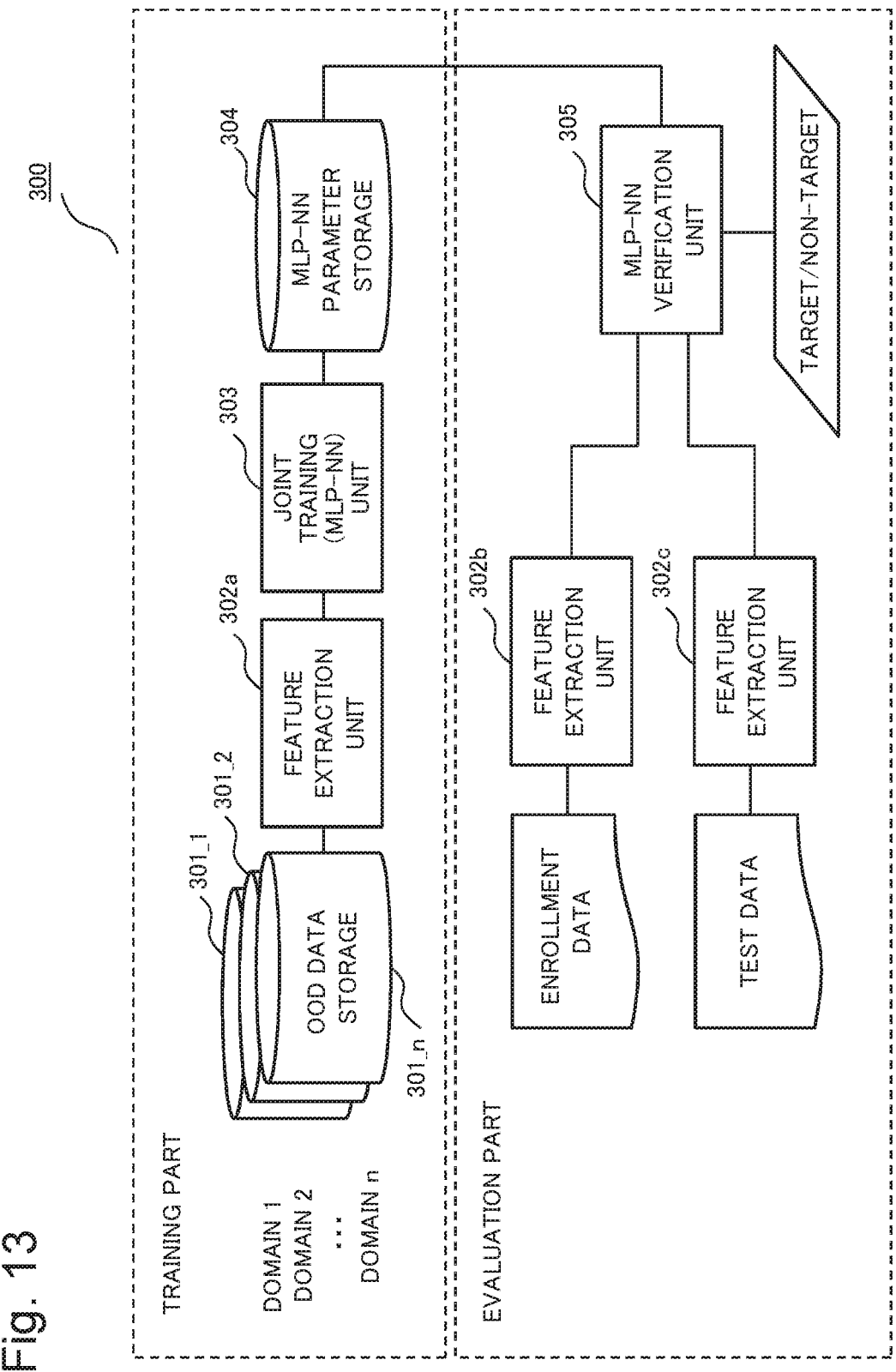
FIG. 13 is a block diagram of a pattern recognition apparatus of the third example embodiment in accordance with the present invention.

FIG. 13 illustrates a block diagram of pattern recognition apparatus 300 of the third example embodiment. Pattern recognition apparatus 300 includes training part and evaluation part.

The training part includes OOD data storages 301_1, 301_2 . . . 301_n (hereafter, described as 301_1-301_n), feature extraction unit 302a, joint training unit 303, MLP-NN parameter storage 304. The evaluation part includes feature extraction units 302b, 302c, and MLP-NN verification unit 305.

OOD data storages 301_1-301_n store OOD data which includes speaker labels and domain labels from n (n is an integer greater than or equal to 1) domains. Contents of OOD data storages 301_1-301_n can be classified for each type of domains. For instance, as shown in FIG. 2, if the domain is "spoken language", OOD data storage 301_1 stores speech recordings of Domain type 1 (e.g. English), OOD data storages 301_n stores speech recordings of Domain type n (e.g. Japanese).

MLP-NN parameter storage 304 stores trained MLP-NN parameters.

Feature extraction unit 302a extracts n sets of feature vectors from data in OOD data storages 301_1-301_n, using the speaker labels and the domain labels.

Joint training unit 303 receives sets of OOD feature vectors from feature extraction unit 302a. Joint training unit 303 trains an MLP and a verification NN simultaneously. For this training, a wide range of optimization techniques can be applied, for example, the gradient decent method, known as back propagation to minimize pre-defined cost functions, such as cross entropy. After the training, joint training unit 303 outputs MLP-NN parameters and stores them in MLP-NN parameter storage 304.

Figure 14:
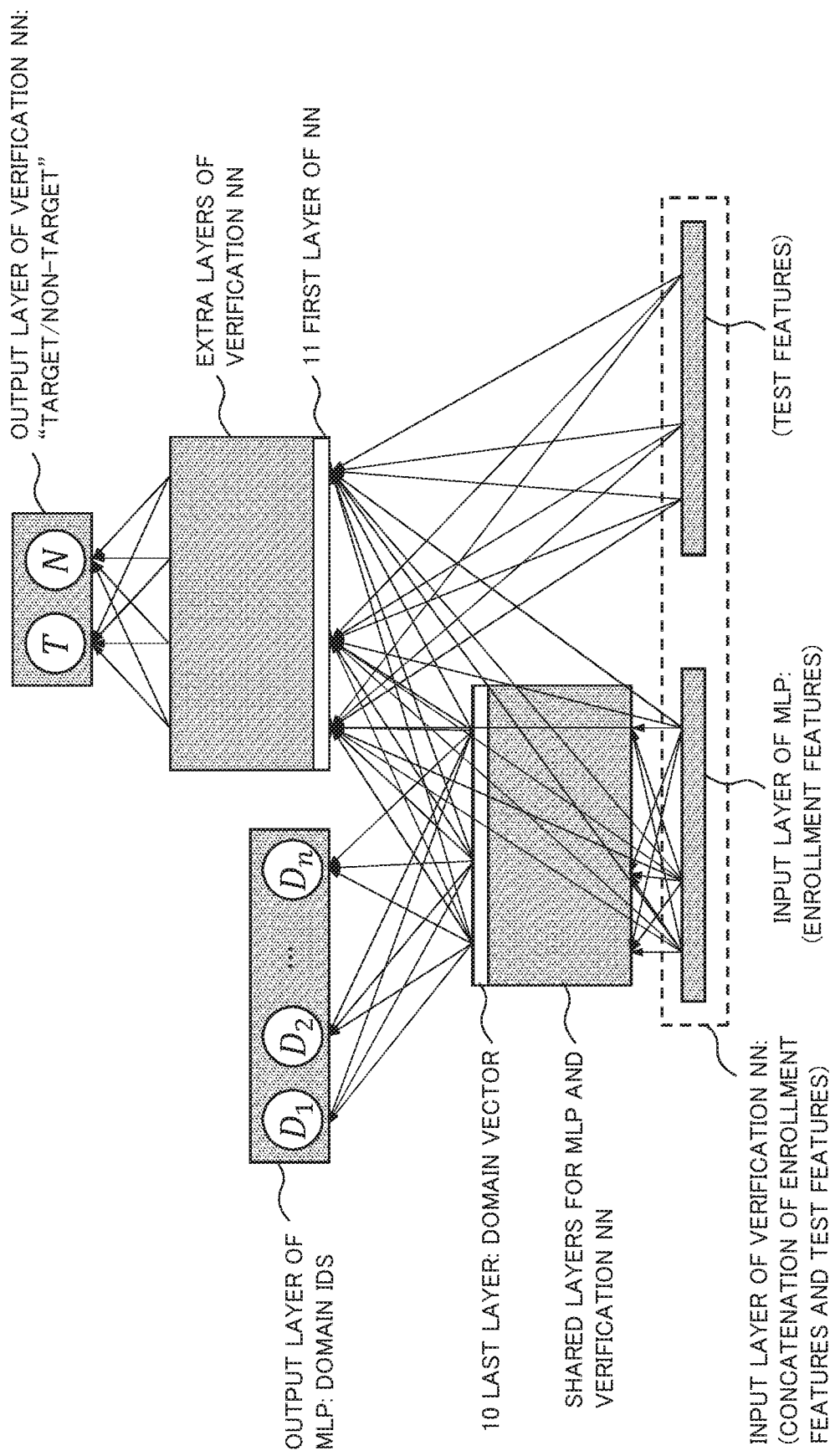
FIG. 14 shows a concept of the joint network structure of MLP and verification NN in the third embodiment.

FIG. 14 shows a concept (model) of the joint network structure of MLP and verification NN. Referring to FIG. 14, shared layers includes the last layer 10 which is connected to the output layer of MLP and is connected to the first layer 11 of NN for the final decision of verification. MLP is considered as the part which contains the shared layers with a kind of feature vector (enrollment features) as the input layer and domain IDs (labels) as the output layer. While verification NN is considered as the part which contains the shared layers and the extra layers with vectors of two concatenated features (enrollment features and test features) as the input layers and the verification result "target/non-target" as the output layer. Here, the last layer 10 is considered as the latent domain vectors. The domain vectors can be extracted from not only the last layer but also other earlier layers as mentioned before.

In the evaluation part, feature extraction unit 302b extracts feature vectors from an enrollment data. Feature extraction unit 302c extracts feature vectors from a test data.

MLP-NN verification unit 305 obtains both of the extracted feature vectors and the MLP-NN parameters stored in MLP-NN parameter storage 304. MLP-NN verification unit 305 calculates a verification score by using the NN model shown in FIG. 14 and applying the equation (1). MLP-NN verification unit 305 determines the result of the calculation indicates whether "target" or "non-target" by comparing a pre-determined threshold. "Target" means the enrollment data and the test data are from the same individual, and "Non-target" means they are from different individuals.

<<Operation of Pattern Recognition Apparatus>>

Next, the operation of pattern recognition apparatus 300 will be described with reference to drawings.

Figure 15:
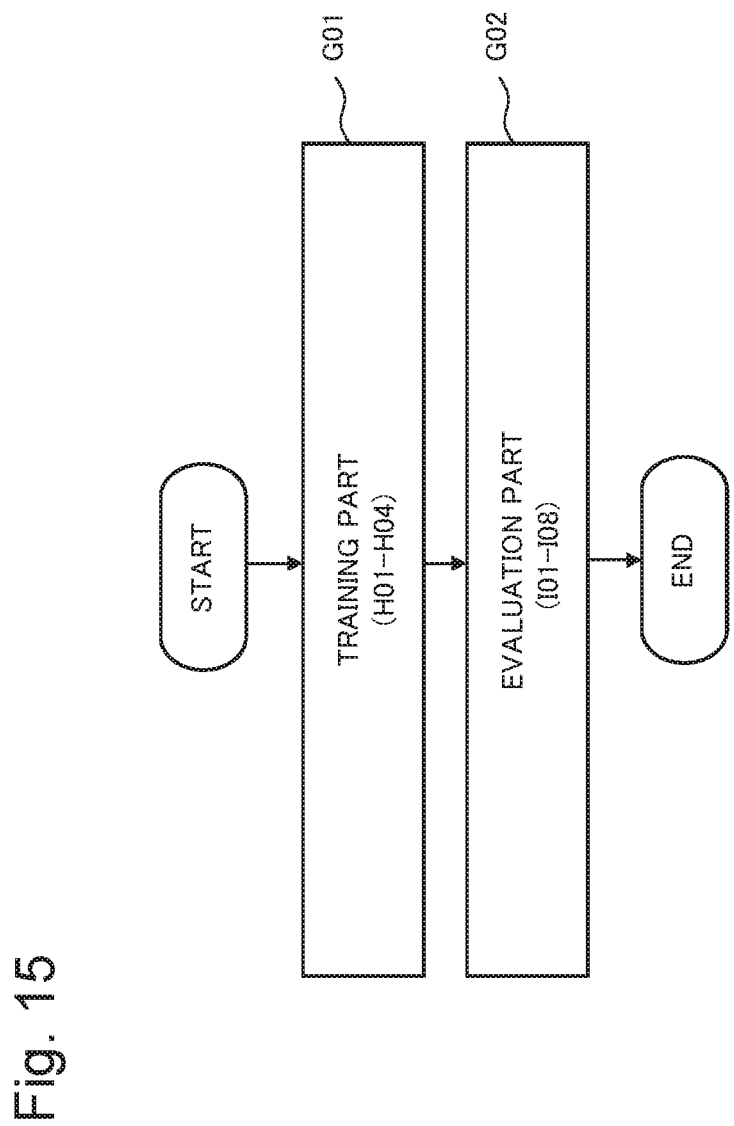
FIG. 15 is a flowchart illustrating operation of the pattern recognition apparatus of the third example embodiment.

The whole operation of pattern recognition apparatus 300 will be described by referring to FIG. 15. FIG. 15 contains operations of training part and the evaluation part. However, this shows an example, the operations of the training and the evaluation can be executed continuously or time intervals can be inserted.

In step G01 (training part), joint training unit 303 is trained based on feature vectors which correspond to OOD data. For this training, a wide range of optimization techniques can be applied, for example, the gradient decent method, known as back propagation to minimize pre-defined cost functions, such as cross entropy. As a result of the training, MLP-NN parameters are generated and stored in MLP-NN parameter storage 304.

In step G02 (evaluation part), MLP-NN verification unit 305 verifies input two data (a enrollment data and a test data) and outputs the verification result, namely, the test data is "target" or "non-target".

Figure 16:
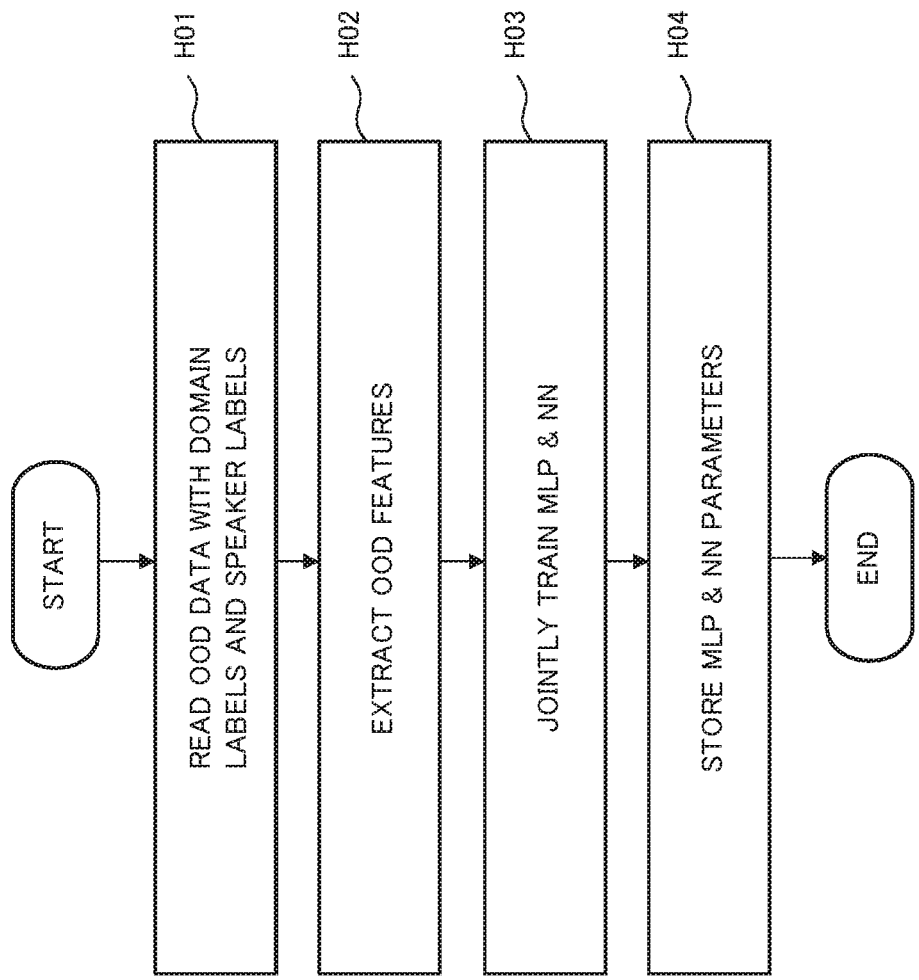
FIG. 16 is a flowchart illustrating operation of the training phase of the pattern recognition apparatus of the third example embodiment.

FIG. 16 is a flowchart illustrating that verification NN and MLP have shared layers and are learned simultaneously. Domain vectors are the last layer 10 (see FIG. 14) of the shared layers. This shows the training part of the embodiment.

Firstly, in step H01, as the beginning of training part, feature extraction unit 302a reads n sets of OOD data with domain labels (e.g. language) and speaker labels (e.g. Speaker 1) from OOD data storages 301_1-301_n.

In step H02, feature extraction unit 302a extracts n sets of feature vectors from OOD data storages 301_1-301_n. For example, feature extraction unit 302a extracts a sequence of MFCCs, as the feature vectors, from each of speech recording of OOD data storages 301_1-301_n.

In step H03, joint training unit 303 trains an MLP and a verification NN jointly using OOD feature vectors sent from feature extraction unit 302a together with their domain labels and speaker labels.

In step H04, as a result of the training, MLP-NN joint training unit 303 generates MLP-NN parameters and store them in MLP-NN parameter storage 304. This is the end of training part.

Figure 17:
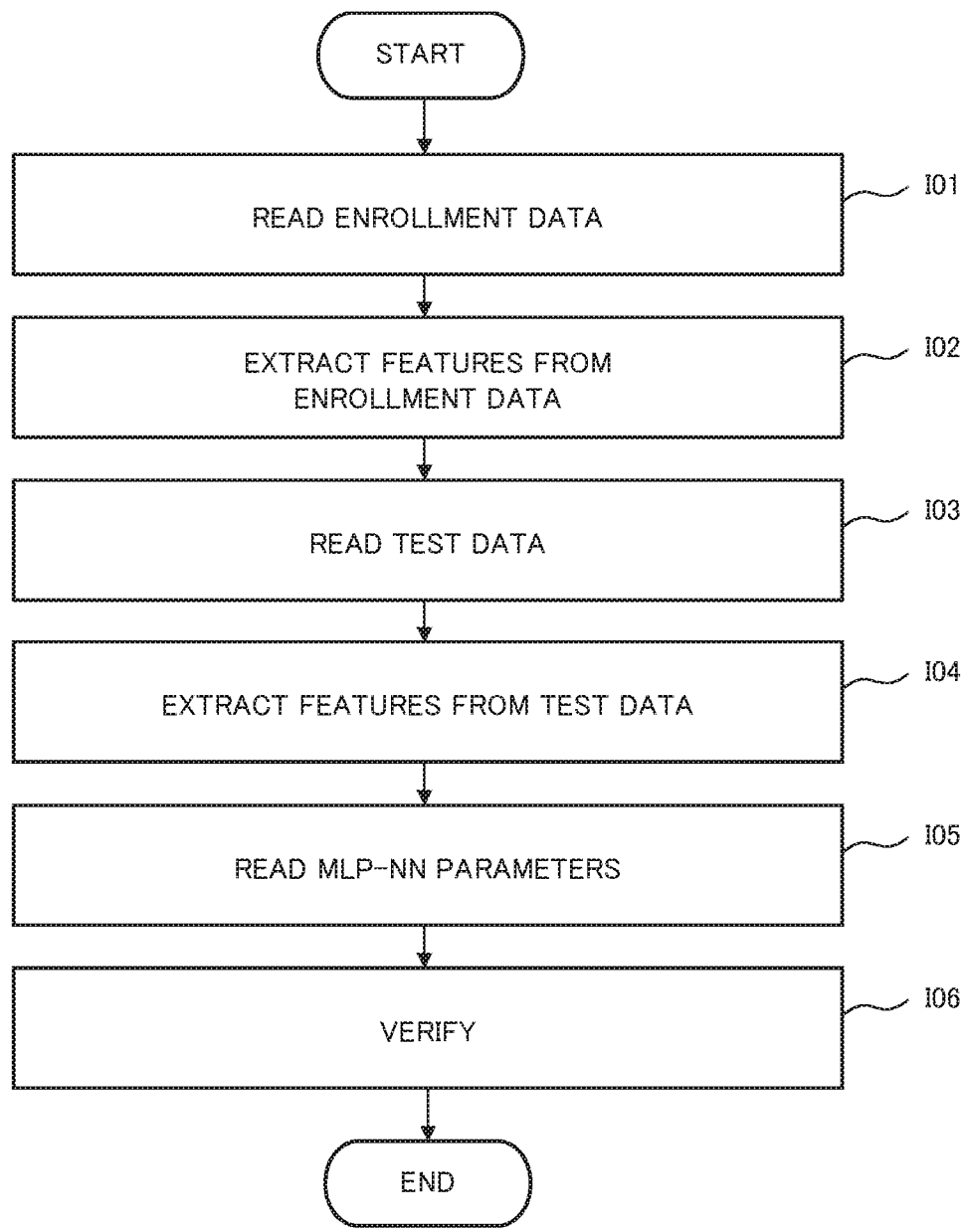
FIG. 17 is a flowchart illustrating operation of the evaluation phase of the pattern recognition apparatus of the third example embodiment.

FIG. 17 is a flowchart illustrating the evaluation part of MLP-NN verification where a domain vector of target domain is made simultaneously.

Firstly, in step 101, feature extraction unit 302b reads enrollment data (basic data) inputted from an external device (not shown in FIG. 13).

In step 102, feature extraction unit 302b extracts feature vectors from the enrollment data. For example, the enrollment data is Cantonese speech recordings. Feature extraction unit 302b extracts sequences of MFCCs of the Cantonese speech recordings.

In step 103, feature extraction unit 302c reads a test data inputted from an external device (not shown in FIG. 13).

In step 104, feature extraction unit 302c extracts feature vectors from the test data. For example, the test data is a Cantonese speech recording. Feature extraction unit 302c extracts a sequence of MFCCs of the Cantonese speech recording.

Note here the order of 101-102 and 103-104 can be switched.

In step 105, MLP-NN verification unit 305 reads MLP-NN parameters from MLP-NN parameter storage 304.

Finally, in step 106, MLP-NN verification unit 305 obtains both of the extracted feature vectors and the MLP-NN parameters stored in MLP-NN parameter storage 304. MLP-NN verification unit 305 calculates a verification score by using the NN model shown in FIG. 14 and applying the equation (1). MLP-NN verification unit 305 determines the result of the calculation indicating whether "target" or "non-target" by comparing a pre-determined threshold. "Target" means the enrollment data and the test data are from the same individual, and "Non-target" means they are from different individuals.

Effect of Third Example Embodiment

As explained above, the third example embodiment can improve the robustness of verification NN against any kind of domain variability, without any data of the target domain needed in the training. The third embodiment also has an advantage over the second example embodiment that MLP and verification NN's parameters are estimated at the same time, which means they are more likely to be the globally optimal solution than those in the second example embodiment.

For all of the three example embodiments, the verification process (two-class classification) can be replaced with a general identification (N-class classification) process.

Fourth Example Embodiment

Figure 18:
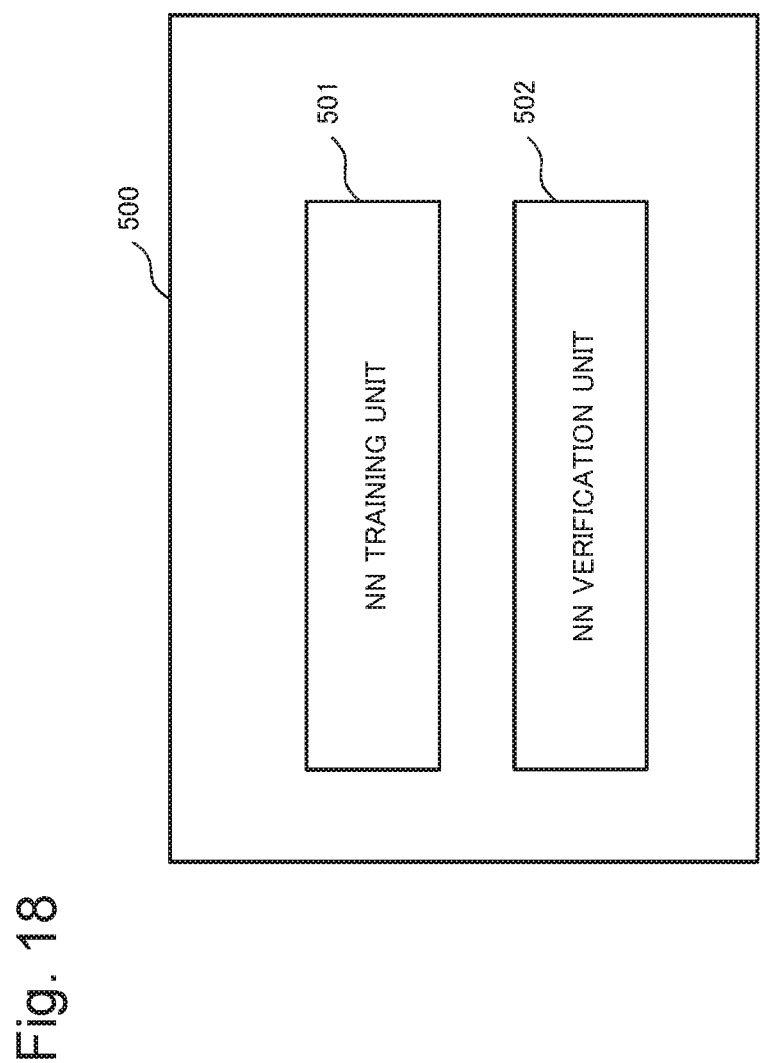
FIG. 18 is a diagram of the fourth example embodiment in accordance with the present invention.

A pattern recognition apparatus of the fourth example embodiment is shown in FIG. 18. The pattern recognition apparatus 500 based on Neural Network (NN), includes: NN training unit 501 that trains an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets; and NN verification unit 502 that verifies a pair of second feature vectors in the specific domain to output whether the pair indicates same individual or not, based on a target domain vector and the NN parameters.

The pattern recognition apparatus 500 can provide classification robustness to any kind of domain variability. The reason is that all classes of domain vectors are used as compensation of labeled data from target domain. By using existing data of various domains, the pattern recognition apparatus 500 can predict target domain vector, so as to be used in verification phase.

<Configuration of Information Processing Apparatus>

Figure 19:
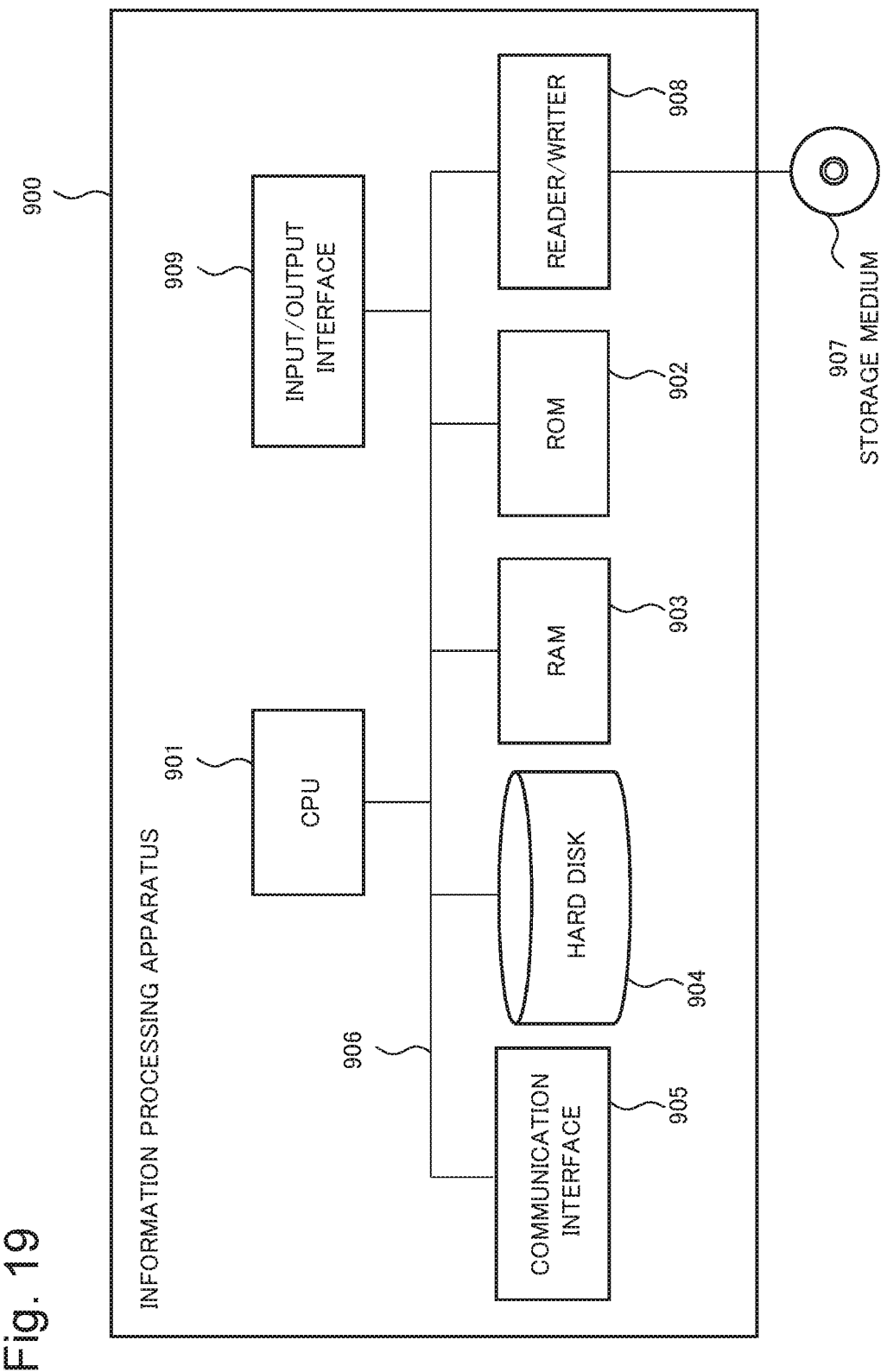
FIG. 19 shows an exemplary computer configuration used in embodiments in accordance with the present invention.
Figure 20:
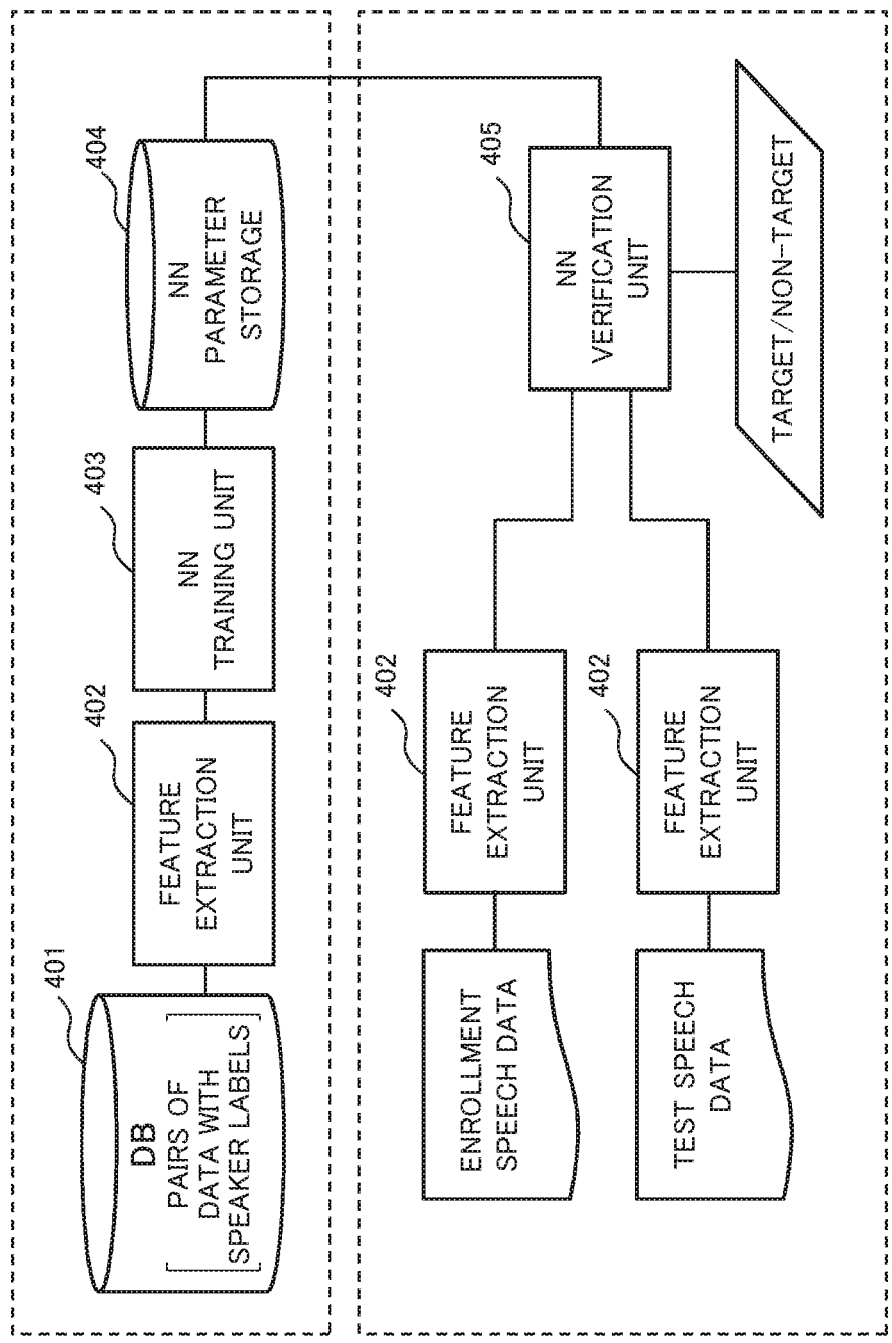
FIG. 20 is a block diagram of a pattern recognition apparatus of NPL 1.

FIG. 19 illustrates, by way of example, a configuration of an information processing apparatus 900 (computer) which can implement a pattern recognition apparatus relevant to an example embodiment of the present invention. In other words, FIG. 19 illustrates a configuration of a computer (information processing apparatus) capable of implementing the devices in FIGS. 1, 8 and 13, representing a hardware environment where the individual functions in the above-described example embodiments can be implemented.

The information processing apparatus 900 illustrated in FIG. 19 includes the following components:

CPU 901 (Central_Processing_Unit);
ROM 902 (Read_Only_Memory);
RAM 903 (Random_Access_Memory);
Hard disk 904 (storage device);
Communication interface to an external device 905;
Reader/writer 908 capable of reading and writing data stored in a storage medium 907 such as CD-ROM (Compact_Disc_Read_Only_Memory); and
Input/output interface 909.

The information processing apparatus 900 is a general computer where these components are connected via a bus 906 (communication line).

The present invention explained with the above-described example embodiments as examples is accomplished by providing the information processing apparatus 900 illustrated in FIG. 19 with a computer program which is capable of implementing the functions illustrated in the block diagrams (FIGS. 1, 8 and 13) or the flowcharts (FIGS. 5-7, FIGS. 10-12 and FIGS. 15-17) referenced in the explanation of these example embodiments, and then by reading the computer program into the CPU 901 in such hardware, interpreting it, and executing it. The computer program provided to the apparatus can be stored in a volatile readable and writable storage memory (RAM 903) or in a non-volatile storage device such as the hard disk 904.

In addition, in the case described above, general procedures can now be used to provide the computer program to such hardware. These procedures include, for example, installing the computer program into the apparatus via any of various storage medium 907 such as CD-ROM, or downloading it from an external source via communication lines such as the Internet. In these cases, the present invention can be seen as being composed of codes forming such computer program or being composed of the storage medium 907 storing the codes.

As a final point, it should be clear that the process, techniques and methodology described and illustrated here are not limited or related to a particular apparatus. It can be implemented using a combination of components. Also various types of general purpose devise may be used in accordance with the instructions herein. The present invention has also been described using a particular set of examples. However, these are merely illustrative and not restrictive. For example the described software may be implemented in a wide variety of languages such as C/C++, Java, MATLAB and Python etc. Moreover other implementations of the inventive technology will be apparent to those skilled in the art.

<Supplementary Notes>

The whole or part of the example embodiments disclosed above can be described as, but not limited to, the following supplementary notes.

(Supplementary Note 1)

A pattern recognition apparatus based on Neural Network (NN), comprising:

NN training means for training an NN model to generate NN parameters, based on at least one first feature vector and at least one domain vector indicating one of subsets in a specific domain, wherein, the first feature vector is extracted from each of the subsets, the domain vector indicates an identifier corresponding to the each of the subsets, NN verification means for verifying a pair of second feature vectors in the specific domain to output whether the pair indicates same individual or not, based on a target domain vector and the NN parameters.

(Supplementary Note 2)

The pattern recognition apparatus according to Supplementary note 1, wherein
the NN verification means utilizes a specific subset in the specific domain as the target domain vector.

(Supplementary Note 3)

The pattern recognition apparatus according to Supplementary note 1, further comprising:
mean extraction means for calculating a mean corresponding to the each of the subsets as the domain vector thereof.

(Supplementary Note 4)

The pattern recognition apparatus according to Supplementary note 1, further comprising:
multi-layer perceptrons (MLP) training means for training MLP based on the first feature vector to generate MLP parameters to extract the domain vector corresponding to the each of the subsets.

(Supplementary Note 5)

The pattern recognition apparatus according to Supplementary note 1, wherein
the NN training means further trains MLP with the NN model training to generate MLP-NN parameters, based on plural of the first feature vectors,
the NN verification means verifies the pair of second feature vectors based on the MLP-NN parameters.

(Supplementary Note 6)

A pattern recognition method using Neural Network (NN), comprising:
training an NN model to generate NN parameters, based on at least one first feature vector and at least one domain vector indicating one of subsets in a specific domain,
wherein, the first feature vector is extracted from each of the subsets,
the domain vector indicates an identifier corresponding to the each of the subsets,
verifying a pair of second feature vectors in the specific domain to output whether the pair indicates same individual or not, based on a target domain vector and the NN parameters.

(Supplementary Note 7)

The pattern recognition method according to Supplementary note 6, wherein
in the verifying, utilizing a specific subset in the specific domain as the target domain vector.

(Supplementary Note 8)

The pattern recognition method according to Supplementary note 6, further comprising:
calculating a mean corresponding to the each of the subsets as the domain vector thereof.

(Supplementary Note 9)

The pattern recognition method according to Supplementary note 6, further comprising:
training MLP based on the first feature vector to generate MLP parameters to extract the domain vector corresponding to the each of the subsets.

(Supplementary Note 10)

The pattern recognition method according to Supplementary note 6, wherein
in the NN training, further training MLP with the NN model training to generate MLP-NN parameters, based on plural of the first feature vectors,
in the NN verifying, verifying the pair of second feature vectors based on the MLP-NN parameters.

(Supplementary Note 11)

A computer readable storage medium storing a pattern recognition program using Neural Network (NN) for causing a computer to recognize a pattern, the program comprising:
training an NN model to generate NN parameters, based on at least one first feature vector and at least one domain vector indicating one of subsets in a specific domain,
wherein, the first feature vector is extracted from each of the subsets,
the domain vector indicates an identifier corresponding to the each of the subsets,
verifying a pair of second feature vectors in the specific domain to output whether the pair indicates same individual or not, based on a target domain vector and the NN parameters.

(Supplementary Note 12)

The storage medium according to Supplementary note 11, wherein
in the verifying, utilizing a specific subset in the specific domain as the target domain vector.

(Supplementary Note 13)

The storage medium according to Supplementary note 11, further comprising:
calculating a mean corresponding to the each of the subsets as the domain vector thereof.

(Supplementary Note 14)

The storage medium according to Supplementary note 11 further comprising:
training MLP based on the first feature vector to generate MLP parameters to extract the domain vector corresponding to the each of the subsets.

(Supplementary Note 15)

The storage medium according to Supplementary note 11, wherein
in the NN training, further training MLP with the NN model training to generate MLP-NN parameters, based on plural of the first feature vectors,
in the NN verifying, verifying the pair of second feature vectors based on the MLP-NN parameters.

REFERENCE SIGNS LIST

100: pattern recognition apparatus
101_1 . . . 101n: OOD data storage
102: IND data storage
103a, 103b, 103c, 103d: feature extraction unit
104a, 104b: mean extraction unit
105: OOD domain vector storage
106: IND domain vector storage
107: NN training unit
108: NN parameter storage
109: NN verification unit
200: pattern recognition apparatus
201_1 . . . 101n: OOD data storage
202: OOD data storage
203a, 203b, 203c, 203d: feature extraction unit
204: MLP training unit
205a, 205b: domain vector extraction unit
206: MLP parameter storage
207: domain vector storage
208: NN training unit
209: NN parameter storage
210: NN verification unit
300: pattern recognition apparatus 301_1 ... 301n: OOD data storage
302a, 302b, 302c: feature extraction unit
303: joint training unit
304: MLP-NN parameter storage
305: MLP-NN verification unit
401: DB
402: feature extraction unit
403: NN training unit
404: NN parameter storage
405: NN verification unit
900: information processing apparatus
901: CPU
902: ROM
903: RAM
904: hard disk
905: communication interface
906: bus
907: storage medium
908: reader/writer
909: input/output interface

What is claimed is:

1. A pattern recognition apparatus based on a Neural Network (NN), comprising:
at least one memory storing a set of instructions; and
at least one processor configured to execute the set of instructions to:
train an NN model to generate NN parameters, based on first feature vectors and domain vectors respectively indicating subsets in a plurality of domains respectively indicating languages other than a specific language,
wherein the first feature vectors are respectively extracted from the subsets, and the domain vectors respectively indicate identifiers corresponding to the subsets;
verify a pair of second feature vectors in a specific domain to output whether the pair is extracted from first data and second data of a same individual or not, based on a target domain vector and the NN parameters, the specific domain indicating the specific language, the target domain vector indicating a subset in the specific domain,
wherein the at least one processor trains the NN model by using the domain vectors as training input to NN model, and verifies the pair by using the target domain vector as verification input to NN model;
read, from a storage, the subsets being speech recordings in the plurality of domains other than the specific domain, the subsets being respectively associated with domains and speakers labels;
extract sets of the first feature vectors respectively from the subsets;
calculate, as the domain vectors, mean vectors of the sets of feature vectors;
store the domain vectors in the storage;
store the NN parameters in the storage after training the NN model;
read the subset in the specific domain from the storage, the subset in the specific domain being speech recordings in the specific domain;
extract third feature vectors from the subset;
calculate, as the target domain vector, a mean vector of the third feature vectors;
store the target domain vectors in the storage;
read enrollment data in the specific domain from the storage;
extract, as one of the pair of second feature vectors, an enrollment feature vector from the enrollment data;
read test data in the specific domain from the storage;
extract, as another of the pair of second feature vectors, a test feature vector from the test data;
read the target domain vector from the storage;
read the NN parameters from the storage; and
verify the pair of second feature vectors.

2. The pattern recognition apparatus according to claim 1, wherein
the at least one processor is further configured to utilize a specific subset in the specific domain as the target domain vector.

3. The pattern recognition apparatus according to claim 1, wherein
the at least one processor is further configured to calculate means respectively corresponding to the subsets as the domain vectors thereof.

4. The pattern recognition apparatus according to claim 1, wherein
the at least one processor is further configured to train a multi-layer perceptron (MLP) based on the first feature vectors to generate MLP parameters to extract the domain vectors corresponding to the subsets.

5. The pattern recognition apparatus according to claim 1, wherein
the at least one processor is further configured to:
train a multi-layer perceptron (MLP) with the NN model training to generate MLP-NN parameters, based on the first feature vectors; and
verify the pair of second feature vectors based on the MLP-NN parameters.

6. A pattern recognition method using a Neural Network (NN), comprising:
training an NN model to generate NN parameters, based on first feature vectors and domain vectors respectively indicating subsets in a plurality of domains respectively indicating languages other than a specific language,
wherein the first feature vectors are respectively extracted from the subsets, and the domain vectors respectively indicate identifiers corresponding to the subsets;
verifying a pair of second feature vectors in a specific domain to output whether the pair is extracted from first data and second data of a same individual or not, based on a target domain vector and the NN parameters, the specific domain indicating the specific language, the target domain vector indicating a subset in the specific domain,
wherein the NN model is trained by using the domain vectors as training input to NN model, and the pair is verified by using the target domain vector as verification input to NN model;
reading, from a storage, the subsets being speech recordings in the plurality of domains other than the specific domain, the subsets being respectively associated with domains and speakers labels;
extracting sets of the first feature vectors respectively from the subsets;
calculating, as the domain vectors, mean vectors of the sets of feature vectors;
storing the domain vectors in the storage;
storing the NN parameters in the storage after training the NN model;
reading the subset in the specific domain from the storage, the subset in the specific domain being speech recordings in the specific domain;
extracting third feature vectors from the subset;
calculating, as the target domain vector, a mean vector of the third feature vectors;
storing the target domain vectors in the storage;

reading enrollment data in the specific domain from the storage;
extracting, as one of the pair of second feature vectors, an enrollment feature vector from the enrollment data;
reading test data in the specific domain from the storage;
extracting, as another of the pair of second feature vectors, a test feature vector from the test data;
reading the target domain vector from the storage;
reading the NN parameters from the storage; and
verifying the pair of second feature vectors.

7. The pattern recognition method according to claim 6, wherein
the verifying includes utilizing a specific subset in the specific domain as the target domain vector.

8. The pattern recognition method according to claim 6, further comprising:
calculating means respectively corresponding to the subsets as the domain vectors thereof.

9. The pattern recognition method according to claim 6, further comprising:
training a multi-layer perceptron (MLP) based on the first feature vectors to generate MLP parameters to extract the domain vectors corresponding to the subsets.

10. The pattern recognition method according to claim 6, wherein
the training includes training a multi-layer perceptron (MLP) with the NN model training to generate MLP-NN parameters, based on the first feature vectors, and
the verifying includes verifying the pair of second feature vectors based on the MLP-NN parameters.

11. A non-transitory computer readable storage medium storing a pattern recognition program using a Neural Network (NN) for causing a computer to recognize a pattern, the program causing a computer to execute:
NN training processing of training an NN model to generate NN parameters, based on first feature vectors and domain vectors respectively indicating subsets in a plurality of domains respectively indicating languages other than a specific language,
wherein the first feature vectors are respectively extracted from the subsets, and the domain vectors respectively indicate identifiers corresponding to the subsets;
NN verification processing of verifying a pair of second feature vectors in a specific domain to output whether the pair is extracted from first data and second data of a same individual or not, based on a target domain vector and the NN parameters, the specific domain indicating the specific language, the target domain vector indicating a subset in the specific domain,
wherein the NN model is trained by using the domain vectors as training input to NN model, and the pair is verified by using the target domain vector as verification input to NN model;
read, from a storage, the subsets being speech recordings in the plurality of domains other than the specific domain, the subsets being respectively associated with domains and speakers labels;
extract sets of the first feature vectors respectively from the subsets;
calculate, as the domain vectors, mean vectors of the sets of feature vectors;
store the domain vectors in the storage;
store the NN parameters in the storage after training the NN model;
read the subset in the specific domain from the storage, the subset in the specific domain being speech recordings in the specific domain;
extract third feature vectors from the subset;
calculate, as the target domain vector, a mean vector of the third feature vectors;
store the target domain vectors in the storage;
read enrollment data in the specific domain from the storage;
extract, as one of the pair of second feature vectors, an enrollment feature vector from the enrollment data;
read test data in the specific domain from the storage;
extract, as another of the pair of second feature vectors, a test feature vector from the test data;
read the target domain vector from the storage;
read the NN parameters from the storage; and
verify the pair of second feature vectors.

12. The storage medium according to claim 11, wherein the NN verification processing utilizes a specific subset in the specific domain as the target domain vector.

13. The storage medium according to claim 11, the program further causing a computer to execute
mean extraction processing of calculating means respectively corresponding to the subsets as the domain vectors thereof.

14. The storage medium according to claim 11, the program further causing a computer to execute
multi-layer perceptron (MLP) training processing of training a MLP based on the first feature vectors to generate MLP parameters to extract the domain vectors corresponding to the sub sets.

15. The storage medium according to claim 11, wherein
the NN training processing further trains a multi-layer perceptron (MLP) with the NN model training to generate MLP-NN parameters, based on the first feature vectors, and
the NN verification processing verifies the pair of second feature vectors based on the MLP-NN parameters.

* * * * *